US005835692A

United States Patent [19]
Cragun et al.

[11] Patent Number: 5,835,692
[45] Date of Patent: Nov. 10, 1998

[54] SYSTEM AND METHOD FOR PROVIDING MAPPING NOTATION IN INTERACTIVE VIDEO DISPLAYS

[75] Inventors: Brian J. Cragun, Rochester; Michael D. Mitchell, Savage, both of Minn.

[73] Assignee: International Business Machines Corporation, Armonk, N.Y.

[21] Appl. No.: 822,888

[22] Filed: Mar. 24, 1997

Related U.S. Application Data

[63] Continuation of Ser. No. 342,952, Nov. 21, 1994, abandoned.

[51] Int. Cl.$^6$ .................................................. G06T 15/10
[52] U.S. Cl. ........................... 395/119; 395/137; 395/348
[58] Field of Search .................................. 395/137, 117, 395/119, 326, 327, 348, 349, 350, 351

[56] References Cited

U.S. PATENT DOCUMENTS

| | | | |
|---|---|---|---|
| 4,129,859 | 12/1978 | Iwamura et al. | 345/123 |
| 4,442,495 | 4/1984 | Sukonick | 345/24 |
| 4,533,910 | 8/1985 | Sukonick et al. | 395/139 |
| 4,642,790 | 2/1987 | Minshull et al. | 395/158 |
| 4,796,201 | 1/1989 | Wake | 395/130 |
| 4,831,556 | 5/1989 | Oono | 395/157 |
| 4,860,217 | 8/1989 | Sasaki et al. | 395/125 |
| 5,148,154 | 9/1992 | MacKay et al. | 345/119 |
| 5,303,388 | 4/1994 | Kreitman et al. | 395/137 X |
| 5,392,388 | 2/1995 | Gibson | 395/159 |
| 5,412,768 | 5/1995 | Ozaki | 395/137 |
| 5,422,987 | 6/1995 | Yamada | 395/137 X |
| 5,446,833 | 8/1995 | Miller et al. | 395/137 X |
| 5,454,371 | 10/1995 | Fenster et al. | 395/119 X |
| 5,463,729 | 10/1995 | Kitaguchi et al. | 395/161 |
| 5,511,157 | 4/1996 | Wang | 395/137 |

*Primary Examiner*—Phu K. Nguyen
*Assistant Examiner*—Cliff N. Vo
*Attorney, Agent, or Firm*—Keith L. Hargrove; Andrew J. Dillon

[57] ABSTRACT

A video imaging system and method that allow a user to manipulate an image displayed on a video display are disclosed. The video display includes a mechanism that controls a portion of a virtual display area to be shown on the display. The video imaging system and method of the present invention include a virtual display that is mappable to an actual video display. A mapping notation is provided to allow for a virtual three-dimensional orientation or mapping notation icon, which allows the user to control which portion of the virtual image area is displayed with respect to the entire virtual image area. The mapping notation icon is manipulated, by a device, such as a mouse or trackball, to allow the user to manipulate the virtual image area to display another portion of the virtual image area.

12 Claims, 21 Drawing Sheets

SYSTEM AND METHOD FOR PROVIDING MAPPING NOTATION IN INTERACTIVE VIDEO DISPLAYS

This is a continuation of application Ser. No. 08/342,952, filed Nov. 21, 1994, now abandoned.

BACKGROUND OF THE INVENTION

1. Technical Field

This patent relates in general to graphical user interface splays, and more particularly to a mapping notation in use in multimedia and GUI displays. More specifically, the present invention relates to a mapping notation method for use in a larger virtual display for controlling navigation within the virtual display.

2. Description of the Related Art

Many multimedia and graphical user interfaces (GUIs) have a limited amount of screen space in which to work. Although screen sizes are increasing, the amount of information the user wants to display is also increasing. One mechanism used to address this is a virtual display. A virtual display is an area much larger than a single display screen, where a user can place windows, icons, and other objects that are part of the computer's graphic user interface (i.e., virtual display mechanisms provide additional "screen real estate"). The physical display screen in this environment behaves like a window, only showing one section of the virtual display space at a time. The mechanisms typically provide a way in which the user can manipulate the various views of the virtual display space. For example, some mechanisms provide an X line and a Y line to indicate both vertical and horizontal displacement from an origin in the upper left hand display. This approach can be found in many graphical user interfaces (e.g., the Macintosh System 7 operating system and the Microsoft Windows operating system).

Unfortunately, virtual displays introduce additional problems. First, virtual displays are difficult to conceptualize and keeping track of one's location can be confusing. A user may easily get lost, or lose objects and windows, in some remote corner of the display. Second, the controls used (keys, mouse buttons, etc.) to navigate a virtual display may be nonintuitive or just plain difficult to manipulate. These problems alone can significantly minimize the benefits of having additional "screen real estate".

These problems are exacerbated by the flat nature of traditional virtual spaces. The edges and boundaries of traditional virtual spaces can prevent efficient use of space because objects cannot overlap the boundaries. This can limit the positions in which windows can be placed, particularly when the proximity of one object to another is important to the application.

SUMMARY OF THE INVENTION

It is therefore one object of the present invention to provide graphical user interface displays.

It is another object of the present invention to provide a mapping notation in use in multimedia and GUI displays.

It is yet another object of the present invention to provide a mapping notation method for use in a larger virtual display for controlling navigation within the virtual display.

According to the present invention, a video imaging system and method are disclosed that allow a user to manipulate an image displayed on video display. The video display further includes an imaging display means or controlling a portion of a virtual image area displayed on the display. A mapping notation icon is also provided as a virtual three-dimensional orientation icon, which allows the user to control which portion of the virtual image area is displayed with respect to the entire virtual image area. The icon is manipulated, by a device, such as a mouse or trackball, to allow the user to manipulate the virtual image area to display another portion of the virtual image area.

An alternative embodiment for providing a three-dimensional mapping notation is accomplished by establishing a virtual space for orienting the displayed image with respect to the virtual image. Next, the system then determines an orientation of the display image with respect to the virtual image. The system then generates a mapping control icon having a virtual three-dimensional image for display on the video display and then the system maps the virtual image to the mapping control icon for allowing the user to manipulate the mapping control icon. This allows the user to manipulate the virtual image to change the displayed image accordingly.

The mapping control icon typically comprises an absolute control icon for showing an absolute orientation of the virtual image and a relative control icon for providing a relative orientation of the virtual image, both with respect to the displayed image. A portion of both icons can be highlighted, thus indicating which portion of the virtual image is actually being displayed. By manipulating the mapping control icon, the user can display another portion of the virtual image with the system regenerating the mapping control icon to depict the then displayed portion of the virtual image.

Typical three-dimensional structures used for mapping the virtual image area include a cylindrical mapping notation wherein the virtual image area is comprised of the radial surface area, a toroidal mapping notation, and a spherical mapping notation.

The above as well as additional objectives, features, and advantages of the present invention will become apparent in the following detailed written description.

BRIEF DESCRIPTION OF THE DRAWINGS

3 The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
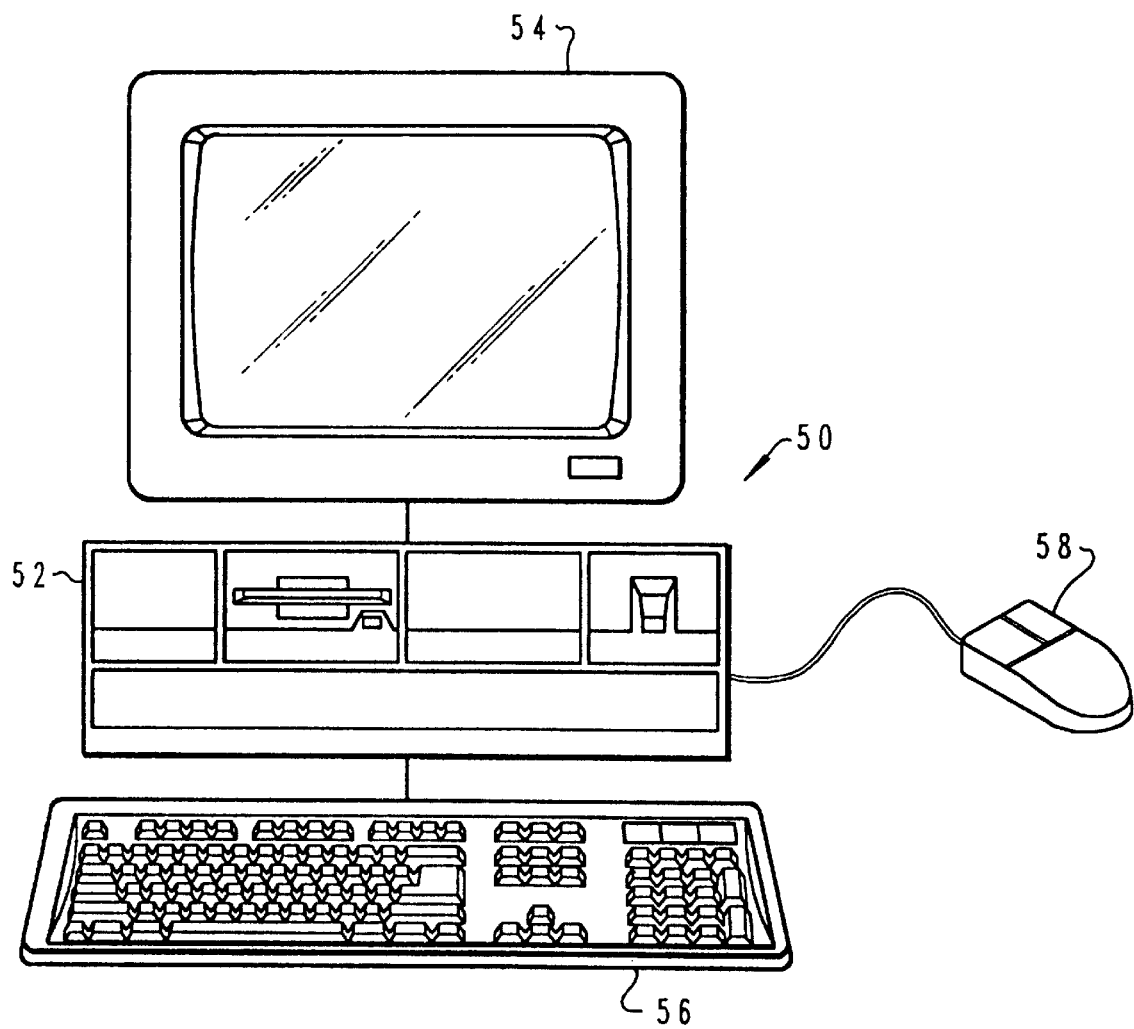
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
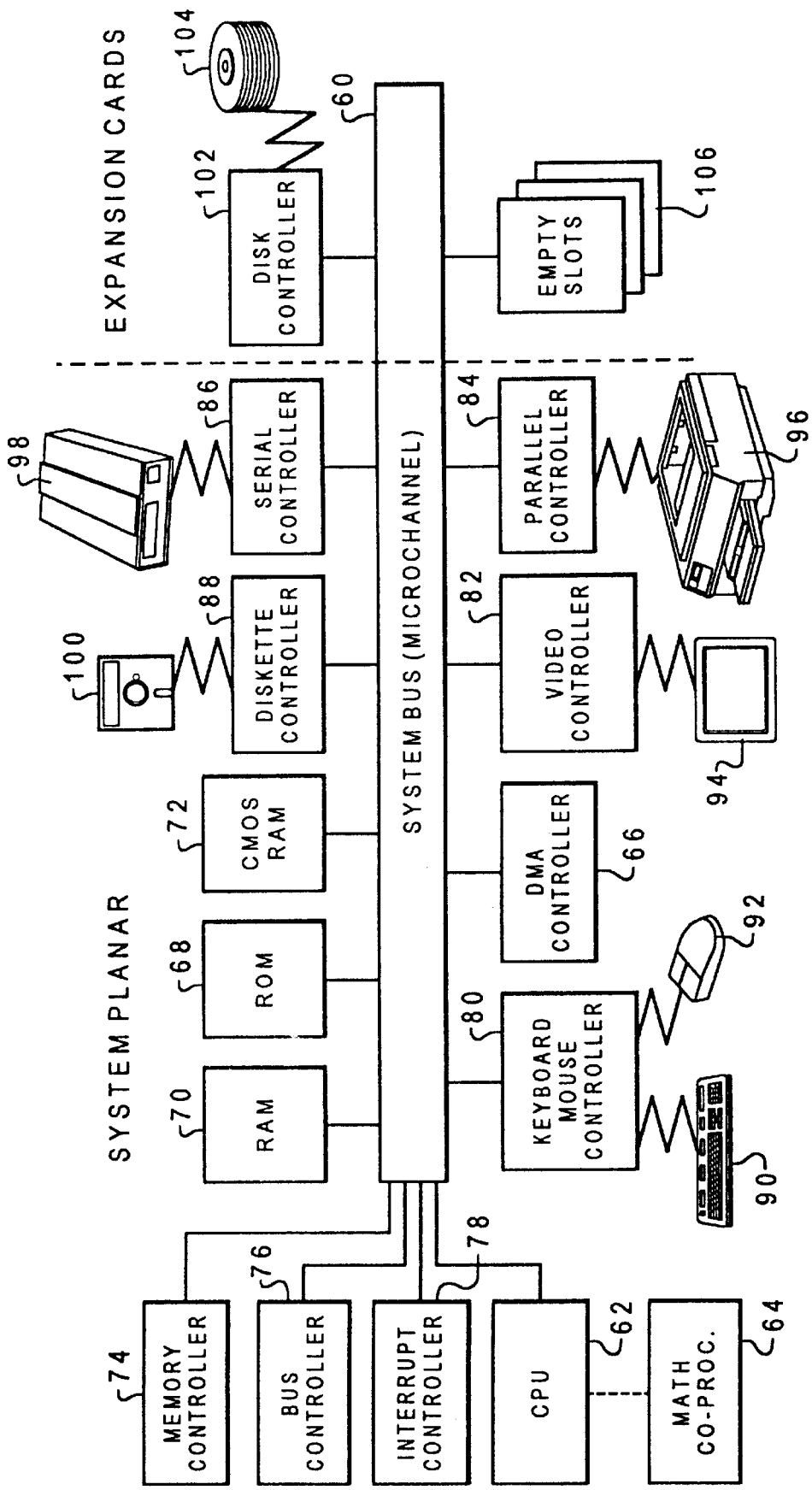
FIG. 2 depicts a block diagram of selected components in the data processing system illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
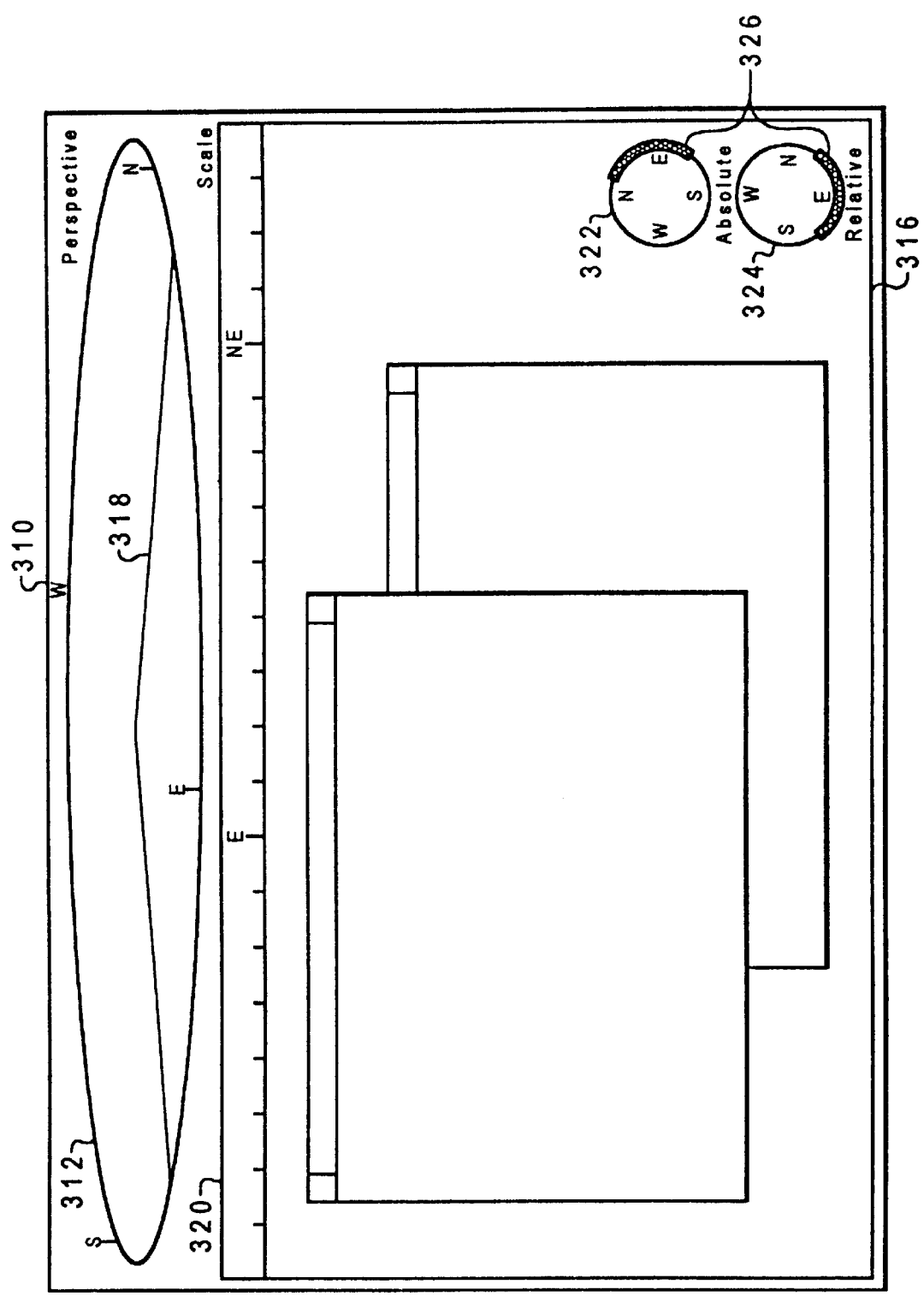
FIG. 3 is an illustration of the display screen using the mapping notation according to the present invention.

For illustrating the mapping and notation system for use on display 54, FIG. 3 illustrates a sample display frame 310. Display 54 is based on a cylinder 312, placed as if one of its flat sides were resting on a table top. The display screen 310 is then the vertical side of cylinder 312. The user sees a section of cylinder 312 on the display screen, as if a screen-sized arc 318 was cut out of cylinder 312 and flattened onto the back of the glass. The top of cylinder 312 includes markings, such as a compass, to advise users of their current location on the display screen 310. These markings could consist of actual compass directions, numbers as seen on the face of the clock, degrees, radiants, or any other measurement of the user's choosing. A compass strip 320 is extended across the top section of the user's work space 316, so that direction markings for the user's location on cylinder 312 can be read more easily. In order to change the orientation of cylinder 312, a user points a mouse or other similar device at a section on the top view of the cylinder 318. When selected, this section would immediately rotate around to the front of the cylinder and let the user view the contents located thereon. Alternatively, the user can drag cylinder 312 itself around in a circle by grabbing it or the compass strip with the mouse.

Two additional controls, an absolute control 322 and relative control 324, are further provided. Absolute control 322 represents a top view of the virtual space of cylinder 312 in a fixed position, such as north pointing up and south pointing down with east and west pointing in their respective directions with respect to north and south. Relative control 324 is similar except that it depicts the relative position of the virtual space, specifically the view that the user is currently observing. In both controls, an arc section, arc 326 is used to indicate the section of cylinder 312 the user is currently viewing. Both absolute control 322 and relative control 324 have markings matching those on top of cylinder 312. The user can drag around in a circle each of the two controls to rotate the cylinder to a particular view. With respect to absolute control 322, the user moves arc section 326 to the desired location. With respect to relative control 324, the user moves the cylinder portion to the desired location.

When the user desires to have a full screen display, display work space 316 can be enlarged to fill the full area of display window 310, thus overlaying on strip 320, cylinder 312, and controls 322 and 324. Work space 316 does not necessarily have to overlay the previously mentioned elements, but rather, the elements may be removed from the display while work space 316 enlarged to fill the full dimensions of the screen 310. The operation for manipulation of screen 310 is illustrated in FIGS. 4–17.

Figure 4:
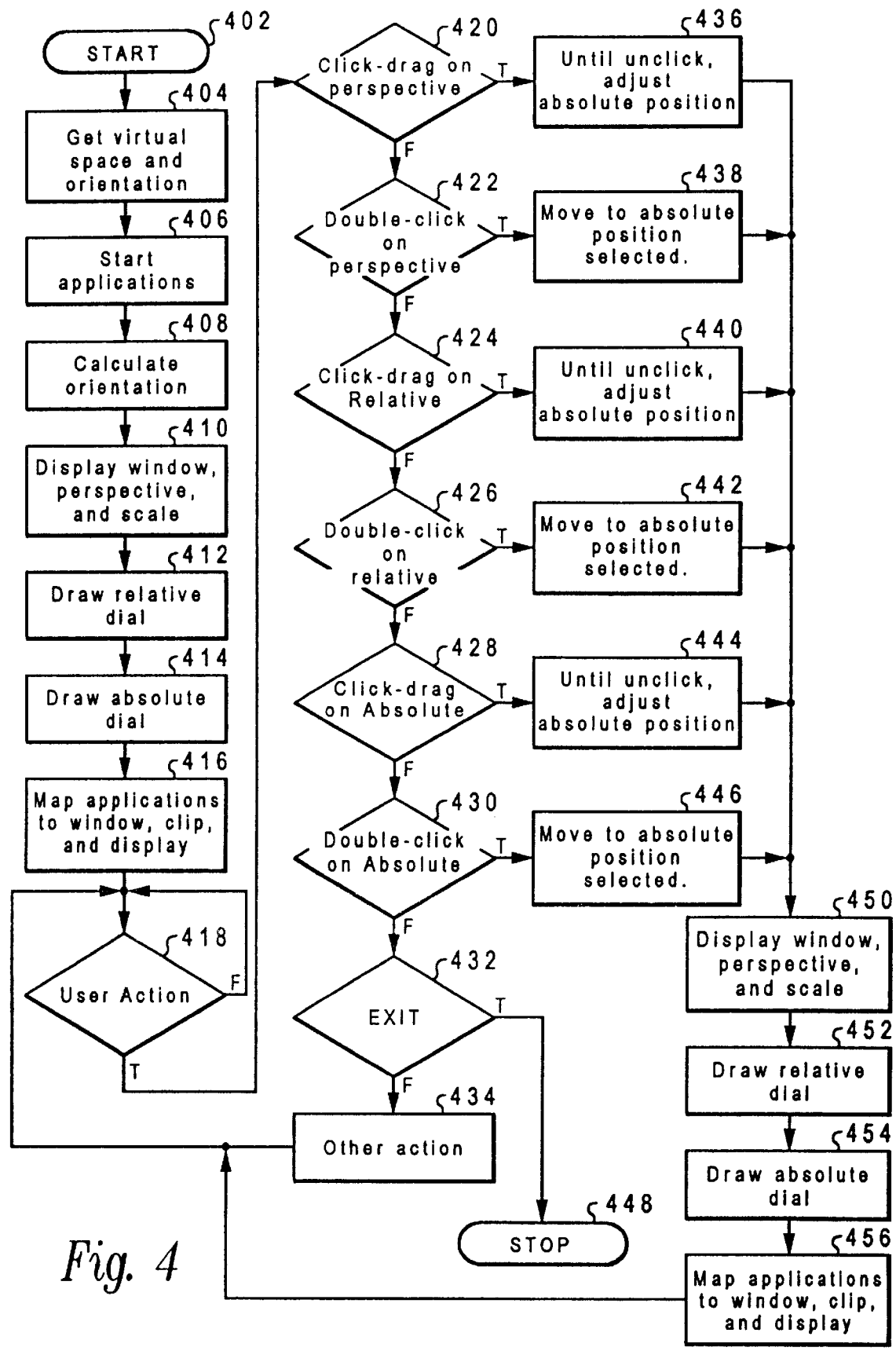
FIG. 4 depicts a flowchart of the mapping notation screen calculation according to the present invention.

FIG. 4 depicts a flowchart of the screen activity with a pointing device, such as a mouse, to enable the user to manipulate the screen display 310. At the start (block 402), the system obtains a virtual space and orientation in block 404. In block 406, the system starts any application or all applications preselected by the user. In block 408, the system calculates the orientation of display screen 310. Next, in block 410, the system generates the display window, the perspective of the screen, as well as the scale. Then, in block 412, the system prepares the relative control dial 324 while, in block 414, the system draws the absolute control dial 322. Next, in block 416, the system maps the applications to the window, picks out the appropriate window section, and displays it on display screen 310. This completes the startup activity of the computer system and now the remaining portion of FIG. 4 is directed towards the actual user's actions with the pointing device, such as the mouse.

In block 418, the system senses whether the user has indicated some type of action, such as a mouse click or keyboard entry. If there is no user action, the system continues to monitor for future action. If an action is detected, the system, in block 420, determines if the action is a click-drag activity with the mouse on the perspective element in screen 310. Actually, the system attempts to determine whether the activity is one of six different types of activities possible in manipulating the screen using the mapping notation according to the present invention. Block 420 represents the click-drag activity on the perspective element. Block 422 represents the double click on the perspective element. Block 424 represents the click-drag on the relative control element. Block 426 represents double click on the relative control element. Block 428 represents the ellipse drag on the absolute control element, while block 430 represents the double click action on the absolute control element.

If block 420 is selected, the system, in block 436, adjusts the absolute position according to mouse motion and repeatedly updates the perspective display until the click has been released. If block 422 is selected, the system, in block 438, moves the screen display to the absolute position selected. If block 424 is selected, the system, in block 440, adjusts the absolute position according to mouse position and repeatedly updates the relative display until the unclick is detected. If block 426 is selected, the system, in block 442, moves the absolute display screen to the absolute position selected. If block 428 is selected, the system, in block 444, adjusts the absolute position according to pointer position and iteratively updates the absolute display until the pointing device unclicks. If block 430 is selected, the system, in block 446, moves the screen to the absolute position selected.

If none of blocks 420–430 is selected, the system checks for an exit request in block 432, and in block 434 processes other system actions such as keyboard input or other application actions before returning to detecting for another user action in block 418. If the system detects that an exit is requested, the system stops in block 448.

After the system processes control updates in blocks 436–446, the system then, in block 450, redisplays the window, perspective, and scale, based upon the updated orientation values. Next, in block 452, the system redraws the relative dial and, in block 454, redraws the absolute dial. Next, in block 456, the system maps the applications to the window, "clips" or removes lines and information that extend beyond the viewing area or are hidden by other applications, and displays the visible parts remaining on screen 310. Following block 456, the system returns to block 418 to await another user action.

Figure 5:
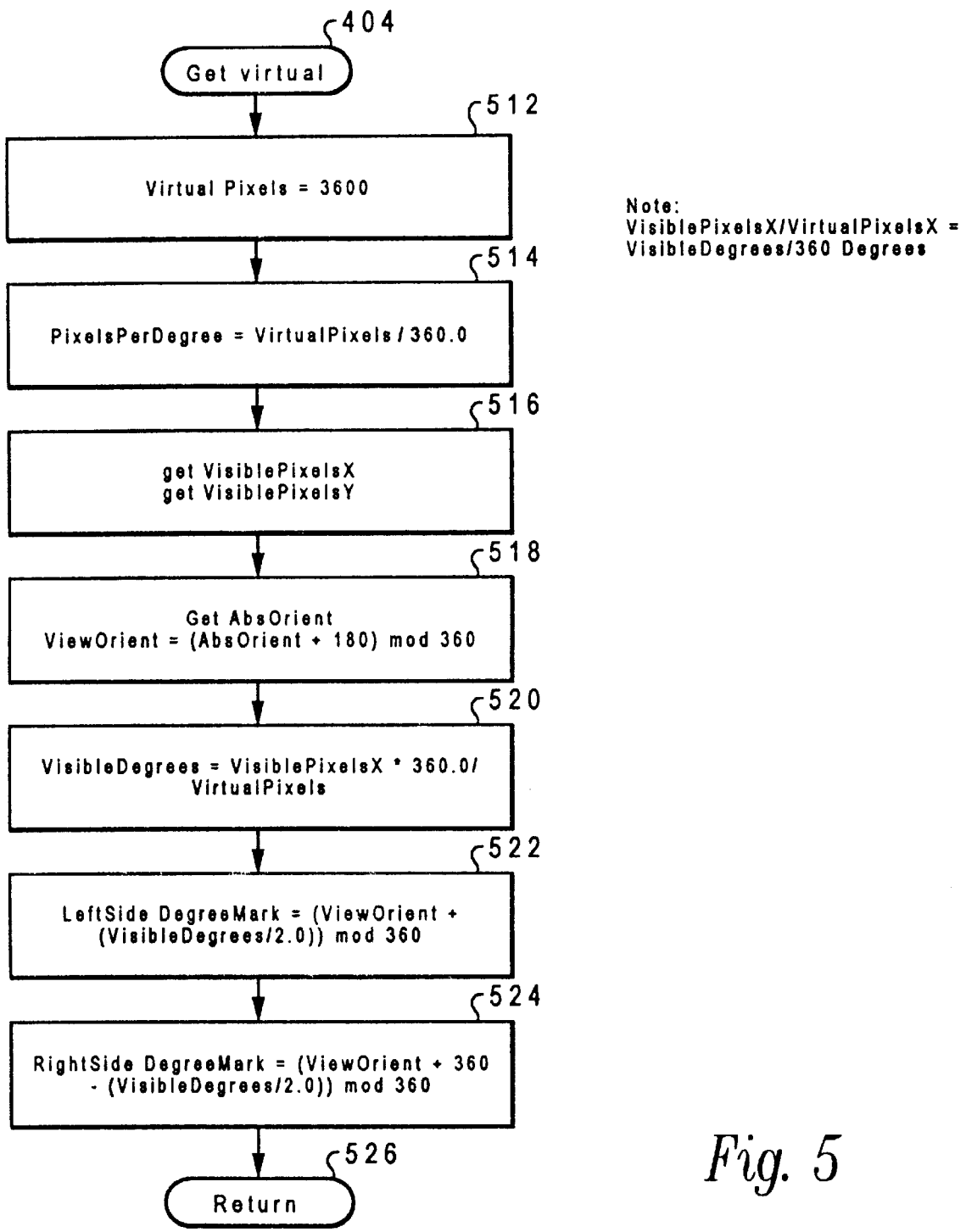
FIG. 5 is a flowchart of the get virtual subroutine as depicted in FIG. 4.

The process of getting the virtual space of block 404, is depicted in the flowchart of FIG. 5. Block 404 is a subroutine used by the system to generate the virtual space and orientation. First, in block 512, the system determines the number of pixels that constitute the total cylindrical space measured horizontally, referred to as virtual pixels, in this example, there are 3600 such virtual pixels. Next, in block 514, the system determines the number of pixels per degree, which is equivalent to the number of virtual pixels divided by 360 degrees for a cylinder. Then, in block 516, the system obtains the visible pixels in the x direction and the visible pixels in the y direction. In block 518, the system obtains from storage the absolute orientation, "AbsOrient", which is a master "true" orientation used for determining other offset orientations. The absolute orientation is the degree value centered on the far side of the perspective control and the up side of the relative control. The view orientation, "ViewOrient", is the degree value centered on the near side of the perspective control and the down side of the relative control. In this enablement, degree values and calculations are based on a compass system, where the full circumference of the cylinder and dials is 360 degrees, with 0 degrees being straight up, and increasing degree values going clockwise. Obviously, other calculation bases could be used without departing from the spirit and scope of this invention.

Continuing in block 518, the view orientation is calculated by adding 180 degrees to the absolute orientation, then adjusting the result to a value between 0 and 360 by using a modulo or remainder function, with 360 as the modulo value. In block 520, the system determines the number of degrees that are visible by multiplying the number of horizontal visible pixels by 360 and dividing by VirtualPixels available from block 512. In block 522, the system determines the left side degree mark, which is the farthest degree visible on the left, and is based upon the view orientation calculation plus the visible degrees divided by 2, which sum is then reduced by modulo 360. Next, in block 524, the right side degree mark, which is the farthest degree visible on the right side of the window, is determined by subtracting the visible degrees divided by 2 from the quantity of view orientation plus 360, then applying a modulo 360. The system then returns to the main program in block 526. It is noted that visible pixels x divided by virtual pixels x equals the visible degrees divided by 360 degrees.

Figure 6:
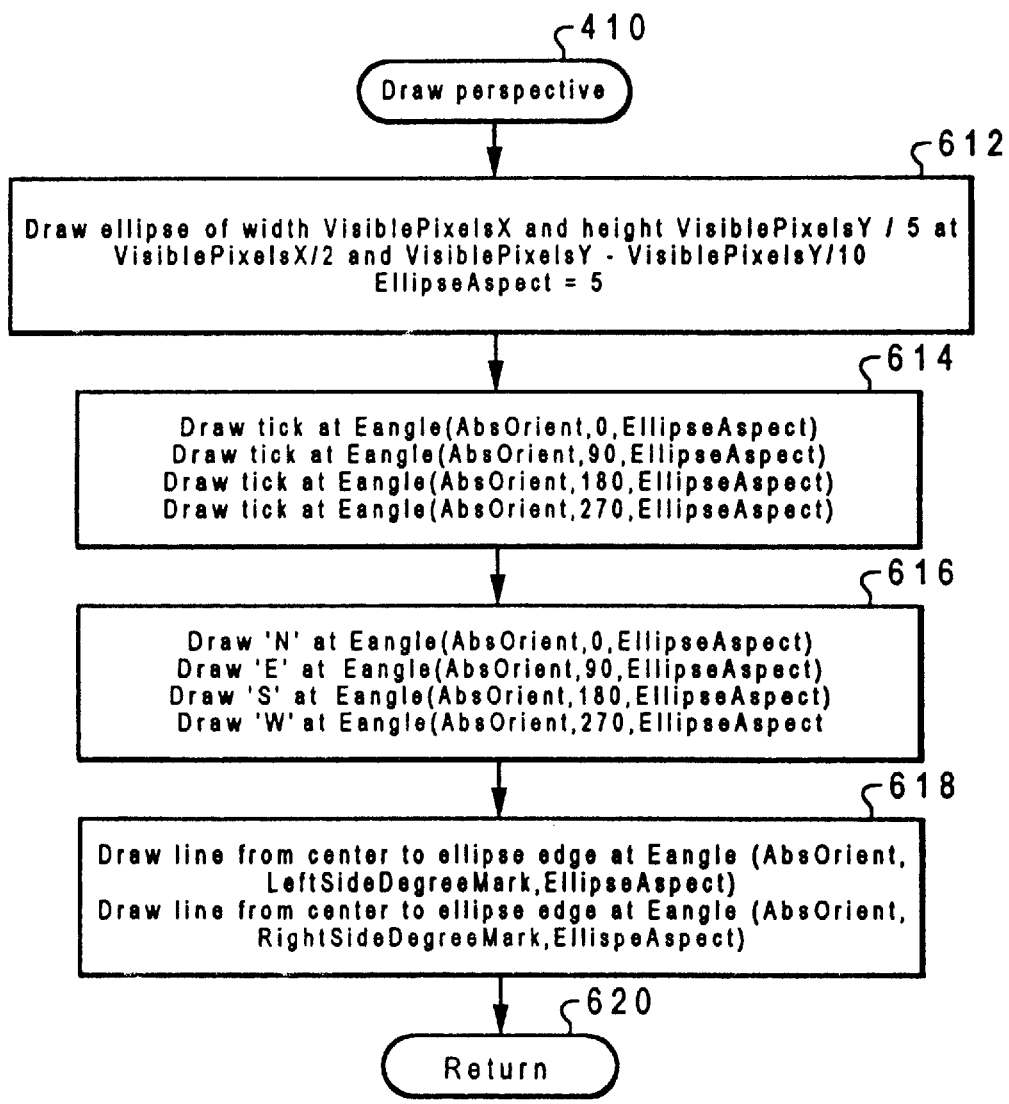
FIG. 6 depicts a flowchart of the draw perspective subroutine as depicted in FIG. 4.

The perspective view, in block 410 of FIG. 4, is determined by the subroutine of the flowchart illustrated in FIG. 6. In block 612, the system draws the ellipse of the width visible pixels x and height visible pixels y over 5 at center position visible pixels divided by 2 and visible pixels y minus visible pixels y divided by 10. In this enablement, x and y coordinates of pixels are measured from an origin in the lower-left corner of the screen. The value "EllipseAspect", which indicates the ratio of the ellipse's width to its height, is set to 5. Next, in block 614, the system draws the tick marks for north, east, south, and west at their respective angle positions calculated by function Eangle, which uses the absolute orientation, an offset of 0, 90, 180, and 270 degrees, respectively, and the ellipse aspect ratio. Next, in block 616, the letters "N", ""E", "S", and "W" are drawn next to the tick marks at their respective positions, as calculated by Eangle using the appropriate offsets. These marks translate to north, east, south, and west, respectively, as correctly oriented about the ellipse based on the absolute orientation and the aspect ratio of the ellipse. Next, in block 618, the system draws a line from the center of the ellipse to the ellipse edge at the position of the left side degree mark. The correct angle is calculated by function Eangle, based on the absolute orientation, the left side degree mark, and the ellipse aspect. This is also done for the right side degree mark. Once the perspective is completed, the system returns in block 620.

Figure 7:
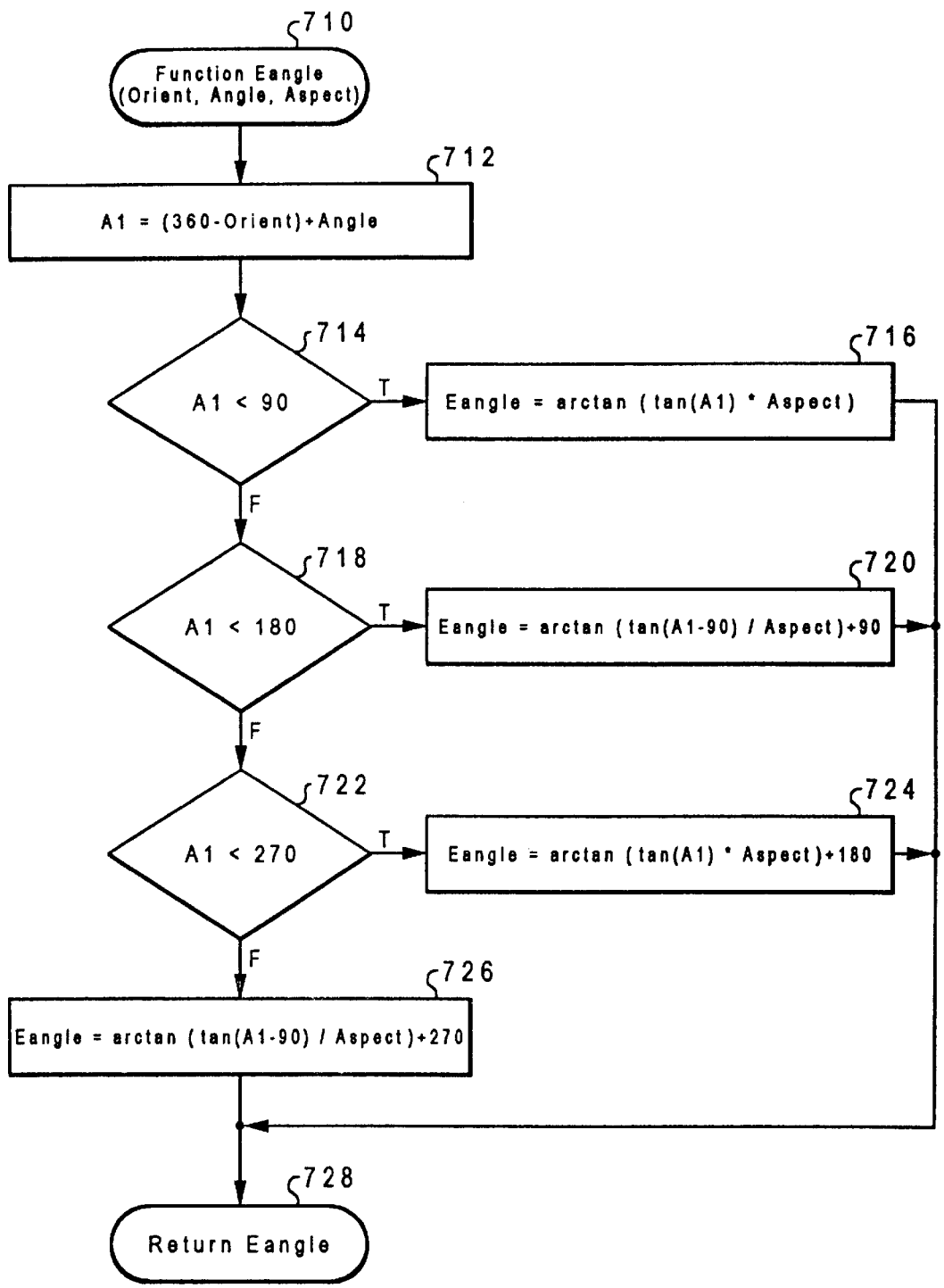
FIG. 7 is a flowchart of the function Eangle subroutine according to the present invention.

FIG. 7 depicts the flowchart of function Eangle, which translates a given input angle to an actual angle to be shown on the screen, given as input the absolute orientation, the angle to be drawn and the aspect ratio of the ellipse. The entry to the function is depicted in block 710. In block 712, a temporary angle value, A1, is calculated that represents the angle as offset by the input orientation. This is calculated by subtracting the orientation angle from 360 and adding the input angle, as shown in block 712. Next, as depicted in blocks 714–726, the system calculates the actual resulting angle using the correct equation for the temporary angle based on its range. In block 714, the system determines if A1 is less than 90 degrees, and if so, in block 716, the Eangle is determined as the arc tangent of the quantity tangent of A1 multiplied by the aspect. If A1 is greater than 90degrees, but less than 180 degrees, in block 718, the system, in block 720, determines the Eangle as being the function of the arc tangent of the contents, the tangent of A1 minus 90 divided by the aspect, which then has 90 degrees added to it. If, in step 722, A1 is greater than 180 degrees, but less than 270 degrees, the system in block 724, determines the Eangle as being equal to the arc tangent of the contents, tangent of A1 times the aspect angle, and then the arc tangent is added to 180 degrees. Finally, if in block 726, A1 is determined to be 270 degrees or more, the Eangle is determined to be the basis of the arc tangent based on the tangent of A1 minus 90 degrees, which is then divided over the aspect angle with the arc tangent being added to 270 degrees. Upon the calculation of the Eangle, the value is returned to the system in step 728.

Figure 8:
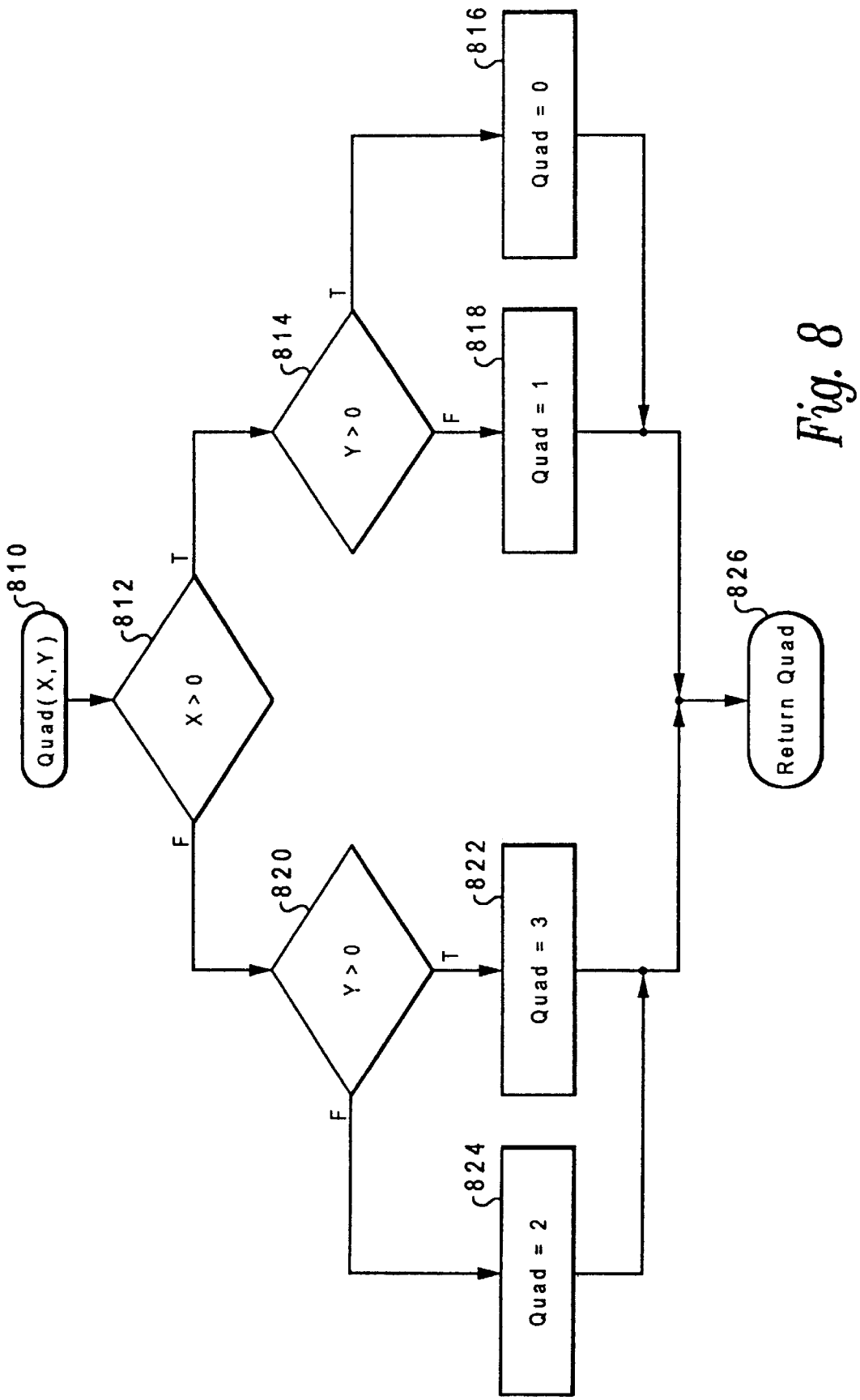
FIG. 8 is a flowchart of the subroutine to calculate the quad value according to the present invention.

Input from the pointing device is given in X, Y coordinates. In order to correctly calculate angles for a circle or ellipse from coordinates, the quadrant of the circle or ellipse wherein the coordinates lie must be determined. Each displayed circle or ellipse has four quadrants, upper right, lower right, lower left, and upper left, which are numbered in this enablement as 0, 1, 2, and 3, respectively. The flowchart in FIG. 8 depicts a function Quad which determines the quadrant number of a coordinate. The inputs to function Quad are an x coordinate and y coordinate, as shown in block 810; these values are provided with respect to the center of a control, as shown in FIGS. 12–17. If in block 812, x is greater than 0, the system then determines if y is greater than 0 in block 814. If both x and y are greater than 0, then the system sets, in block 816, the quadrant value to zero, indicating the zero quadrant. If on the other hand, in block 818, the system determines that x is positive and y is zero or less, the system determines that the quadrant is quadrant one. If in block 812, the system determines that x is zero or less, the system then proceeds, in block 820 to determine if y is greater than zero. If x is less than zero and y is greater than zero, the system sets the quadrant as quadrant three, in block 822. If both y and x are zero or less, the system sets, in block 824, the quadrant as quadrant two. The number of the quadrant is returned in block 826.

Figure 9:
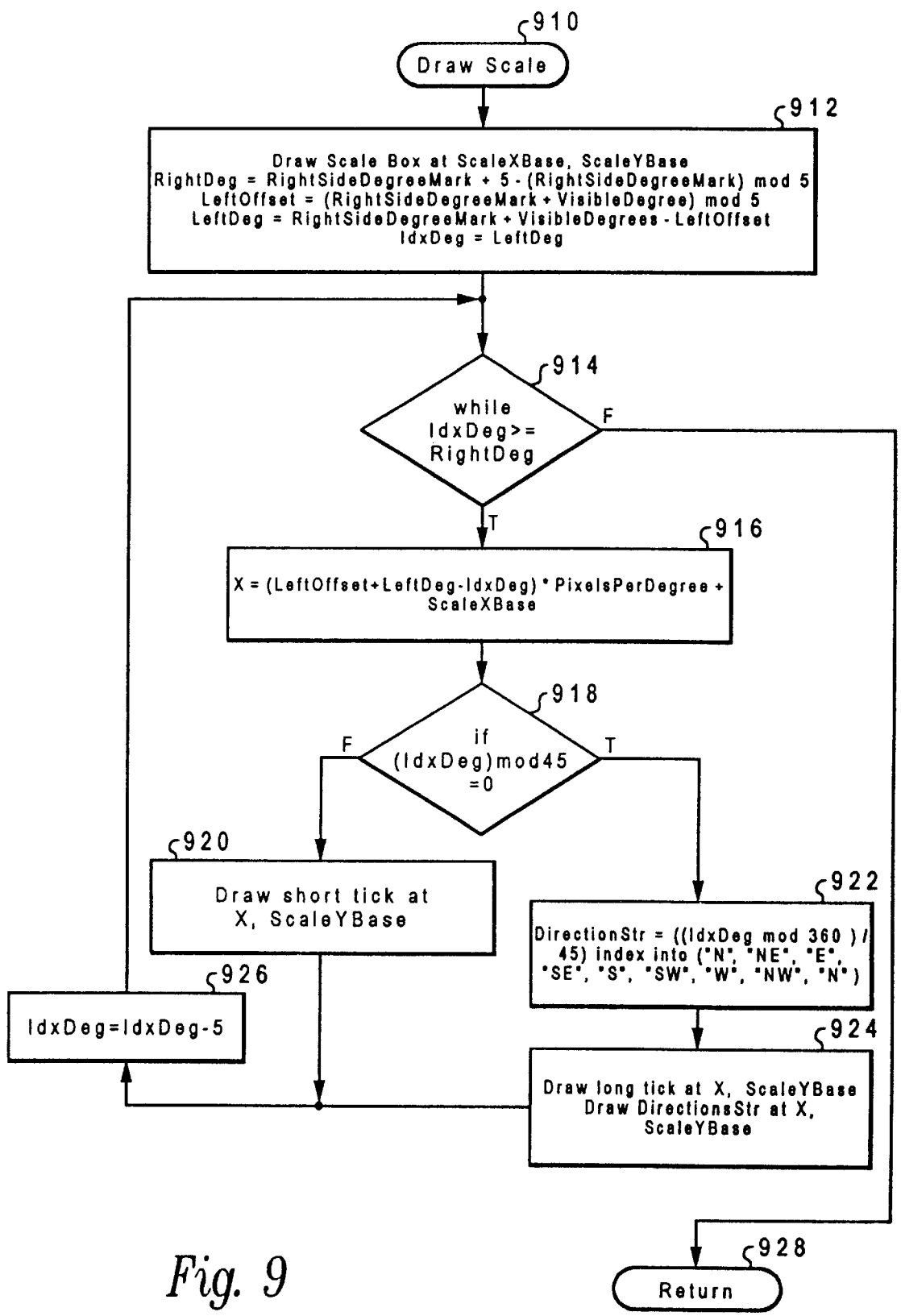
FIG. 9 is a flowchart of the draw scale subroutine according to the present invention.
Figure 10:
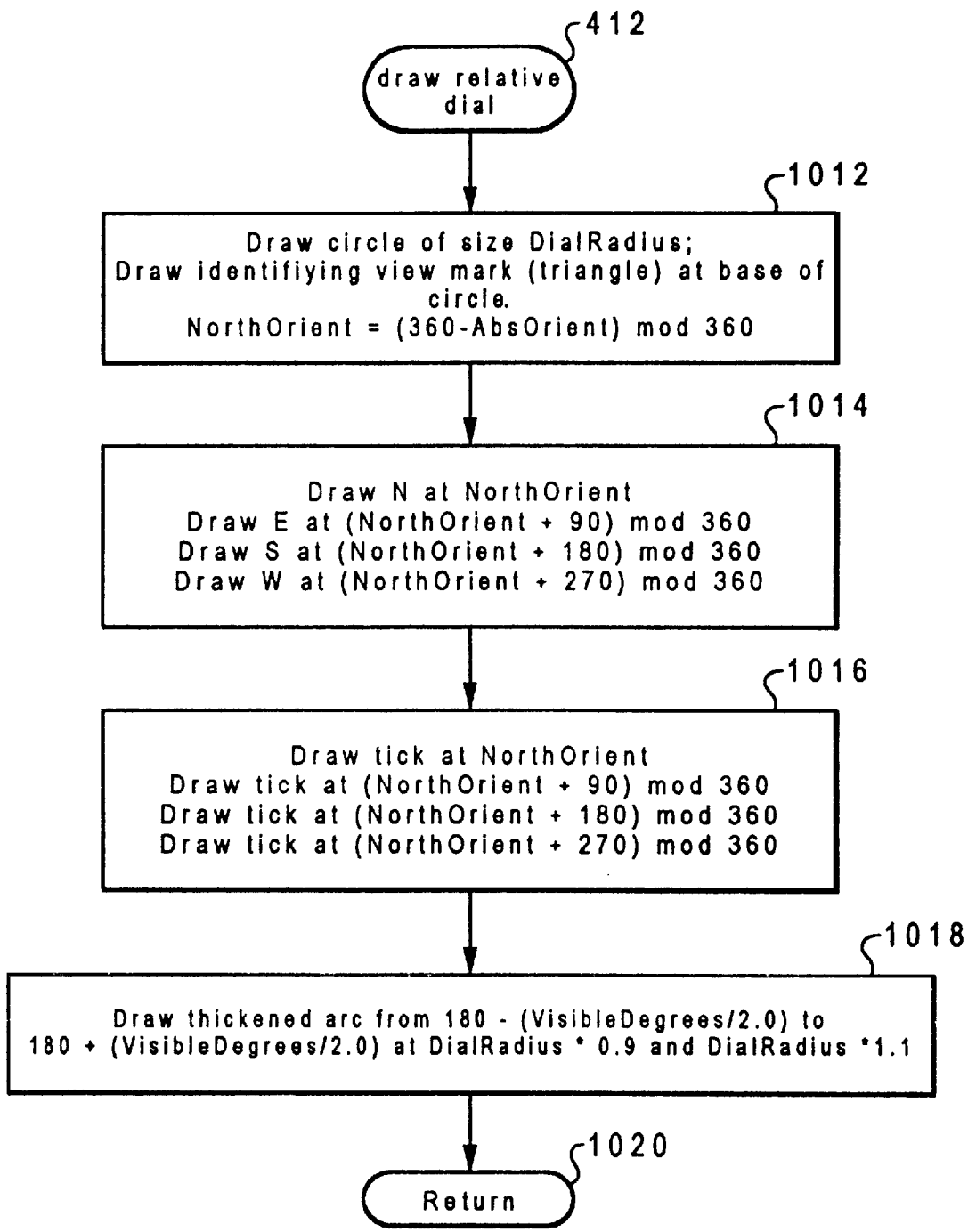
FIG. 10 depicts the draw relative dial subroutine as depicted in FIG. 4.
Figure 11:
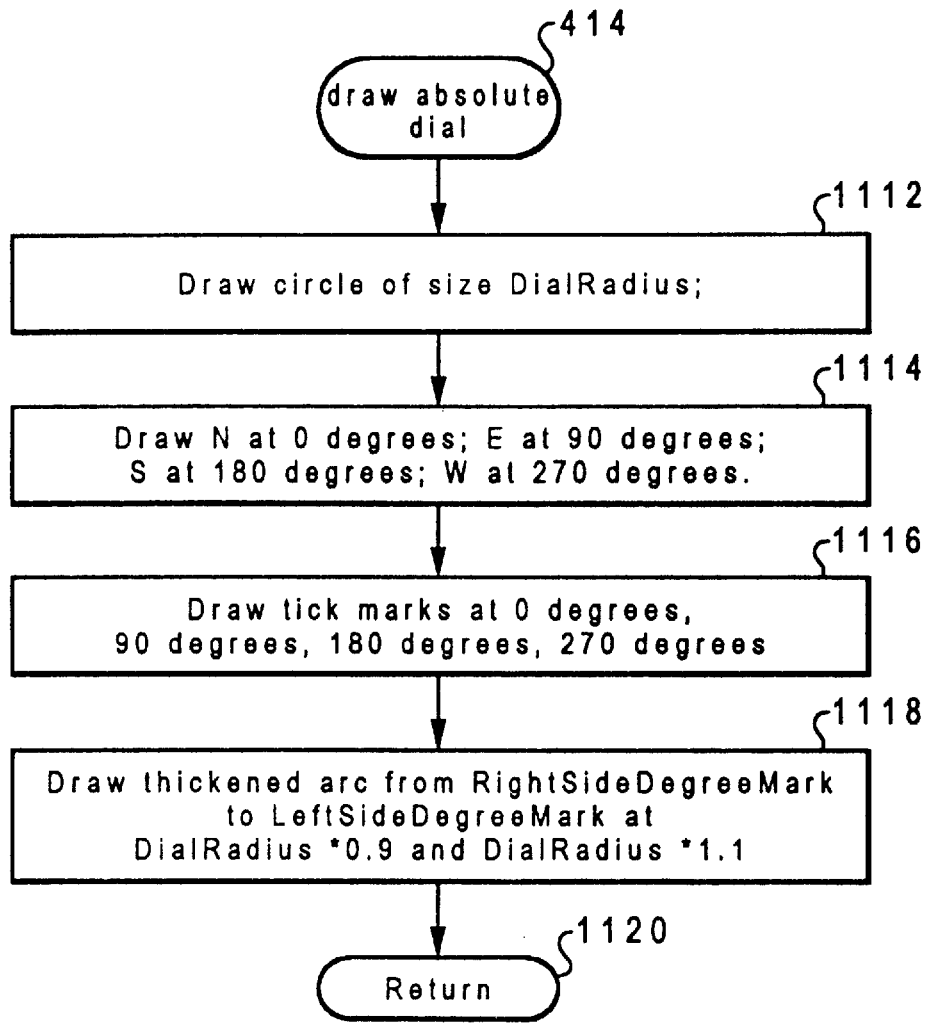
FIG. 11 is a flowchart of the draw absolute dial subroutine according to that depicted in FIG. 4.

The compass strip or scale display, depicted as 320 in FIG. 3, shows compass values and a series of tick marks in five degree increments that correspond to that part of the cylinder which is visible. The draw scale subroutine as depicted in the flowchart of FIG. 9 is based on block 410 of FIG. 4. First, the draw scale subroutine is invoked in block 910. Next, in block 912, the system first draws the outer box for the scale starting at position ScaleXBase and ScaleYBase. Continuing in block 912, the system determines the degree value of the rightmost tick degree, or the degree where the rightmost tick will be, by adding 5 to the right side degree mark and subtracting right side degree mark modulo 5. This equation has the effect of rounding right side degree mark to the next highest degree divisible by five. Next, in block 912, the system determines the number of degrees between the last tick mark on the left and the visible left edge, by modulo 5 of the quantity right side degree mark plus visible degrees, and keeps this value as left offset. Further, in block 912, the leftmost tick degree, or the degree where the leftmost tick should be, is determined by adding right side degree mark to visible degrees and subtracting the left offset. The leftmost tick mark may be a value greater than 360; this allows the loop status to be more easily checked in block 914. Lastly, in block 912, the degree index is set to the leftmost tick mark value in preparation for processing. In block 914, the system determines whether the degree index is greater than or equal to rightmost tick degree. If, in block 914, the index degree is greater than or equal to the rightmost tick degree, the system, in block 916, determines the x location, which is equal to the left offset plus the leftmost tick degree minus the degree index, the entire quantity multiplied by the pixels per degree and then added to the base x position of the scale. Next, in block 918, the system determines whether the degree index is on a major compass direction, which occur every 45 degrees (e.g. north, northeast, east, southeast, etc.), by seeing if degree index modulo 45 is equal to 0. If the equation in block 918 is not zero, the degree index is not on a major compass direction, and the system draws a short tick, in block 920, at coordinates based upon the calculated x, and the scale y coordinate base. If, in block 918, the degree index modulo 45 does equal zero, the system, in block 922, determines the direction string based upon an index into a string array containing "N","NE","E","SE","S","SW","W","NW", "N"). The index into the array is calculated in block 922 as the result of degree index modulo 360 divided by 45. Then, in block 924, the system draws a long tick and subsequently the direction string at the coordinates based upon the x calculated in block 916 and the scale y coordinate base. Then in block 926, the degree index is decremented by 5. If, in block 914, the degree index is less than the rightmost tick degree, the system would return in block 928. When the system wants to draw the relative dial, the system invokes the subroutine 412, which is depicted in the flowchart of FIG. 10. In block 1012, the system first draws the circle of size dial radius and then draws the identifying viewmark (triangle) at the base of the circle. The north orientation is then determined by 360 minus the absolute degree orientation, the quantity modulo 360 degrees. Next, in block 1014, the system draws "N" for north at the north orientation and then draws "E" for east at the quantity north orientation plus 90 degrees modulo 360, draws "S" for south at the quantity north orientation plus 180 degrees modulo 360, and draws "W" for west at the quantity north orientation plus 270 degrees modulo 360. In block 1016, the system then draws the north tick at the north orientation, the second tick is drawn at the quantity north orientation plus 90 degrees modulo 360, third tick is drawn at the quantity north orientation plus 180 degrees modulo 360, and a final tick is drawn at the quantity north orientation plus 270 degrees modulo 360. In block 1018, the system draws a thickened arc, as represented by the arc 326 in FIG. 3, beginning at 180 degrees minus the quantity visible degrees divided by 2, and ending at 180 degrees plus the quantity visible degrees divided by 2, with a radius thickness of 0.9 of the dial radius to 1.1 of the dial radius. Upon completion, the system returns in block 1020. When the system draws the absolute dial, it invokes the subroutine draw absolute dial shown in block 414 and represented by the flowchart in FIG. 11. In block 1112, the system draws a circle of the size dial radius. In block 1114, the system draws the "N" symbol at zero degrees, the "E" symbol at 90 degrees, the "S" symbol at 180 degrees, and the "W" symbol at the 270 degree mark, all corresponding to the compass directions north, east, south and west. Next, in block 1116, the system draws tick marks at zero degrees, 90 degrees, 180 degrees and 270 degrees, corresponding to the "N", "E", "S", and "W" markers. Next, in block 1118, the system draws the thickened arc from a first point starting at the right side degree mark value, to the left side degree mark value, with a thickness of the dial radius multiplied by 0.9, to the dial radius multiplied by 1.1, as represented by the arc 326 in FIG. 3. Upon completion, the system returns in block 1120.

Figure 12A:
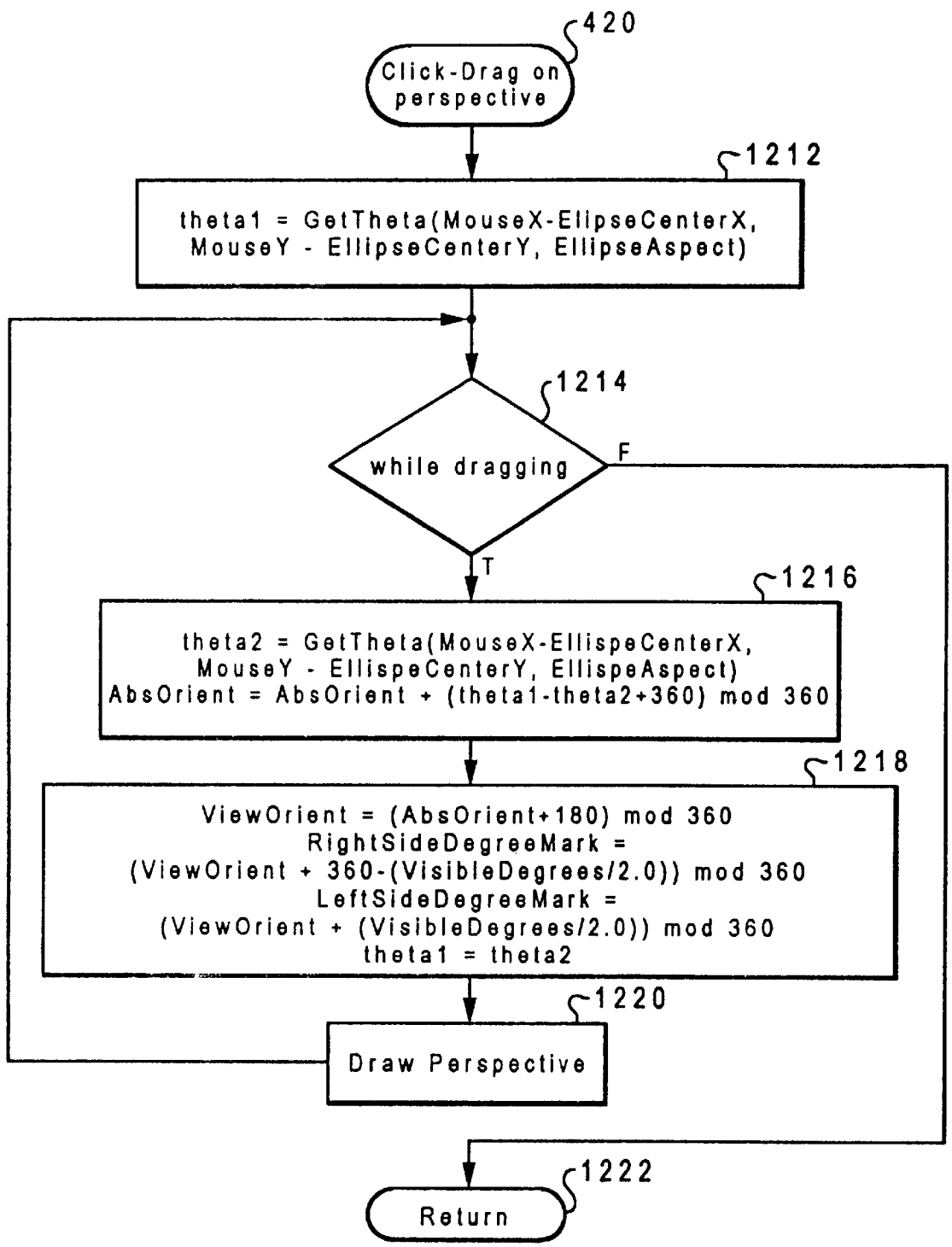
FIG. 12A is a flowchart of the click drag on perspective subroutine according to FIG. 4.
Figure 12B:
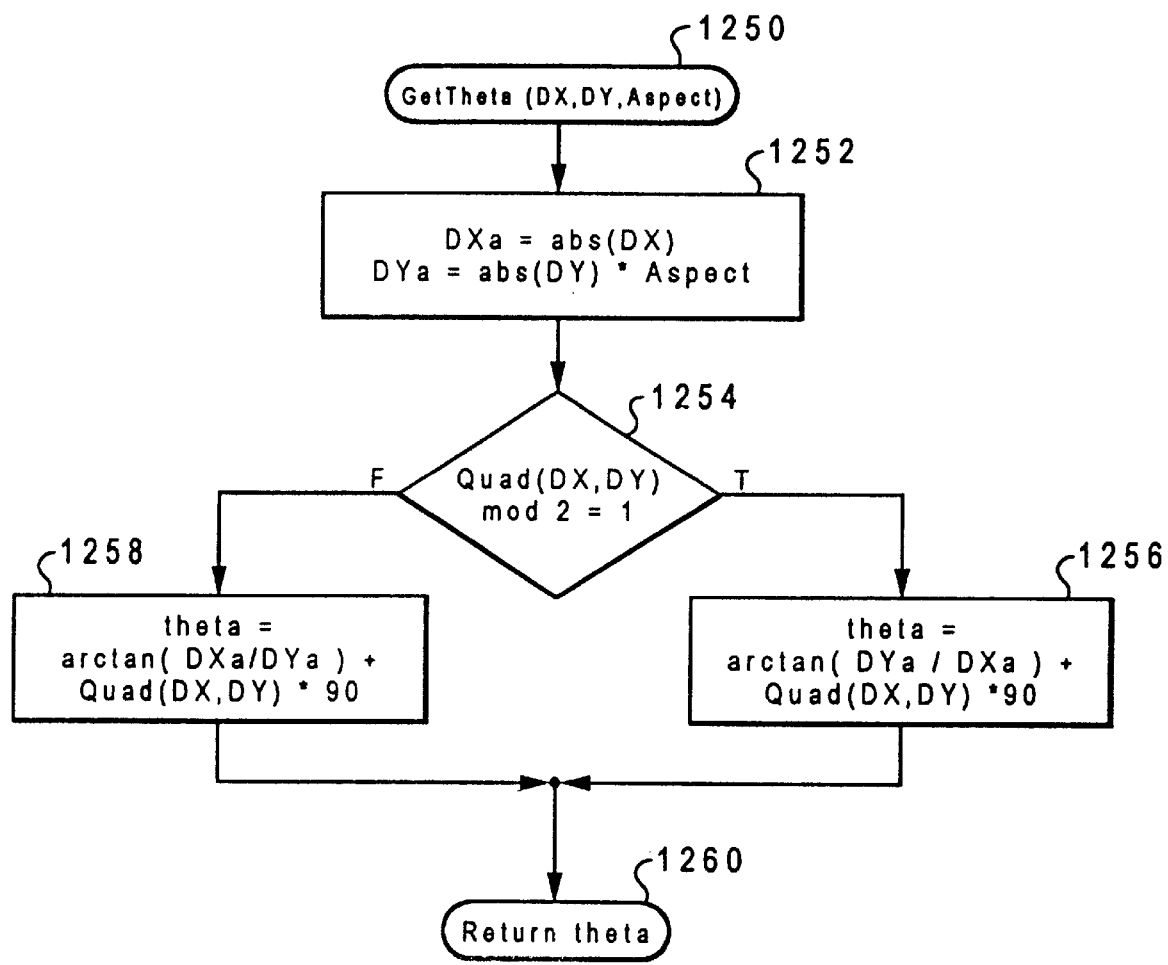
FIG. 12B is a flowchart of the subroutine to calculate the angle of a selection point according to the present invention.

When a user clicks and drags on the perspective control, the click and drag on perspective subroutine of block 420 is invoked, as depicted in the flowchart of FIG. 12A. In block 1212, the system determines the angle theta1 of the first click relative to the center of the perspective ellipse, by calling function GetTheta with the values mouse x coordinate minus ellipse center x coordinate, mouse y coordinate minus ellipse center y coordinate, and ellipse aspect ratio. The function GetTheta, given the change in an x coordinate and the change in a y coordinate and a modifying aspect ratio, will return the true angle of the coordinate with respect to the coordinate center (x=0, y =0); GetTheta is depicted in FIG. 12B and is described in detail later on. While the user continues dragging the mouse and pressing the button in block 1214, the system, in block 1216, calculates the new angle of the mouse with respect to the ellipse center, by calling GetTheta as before with the new mouse x and y coordinates, and keeping this value as theta2. Continuing in block 1216, the absolute orientation is updated with the absolute orientation plus the quantity theta1 minus theta2 plus 360 modulo 360. Then, in block 1218, the view orientation is set equal to the absolute orientation plus 180 degrees, the quantity modulo 360. Next, in block 1218, the right side degree mark is updated with the value of the view orientation plus 360 degrees minus visible degrees divided by 2, the entire quantity modulo 360. Continuing in block 1218, the left side degree mark is set equal to the quantity of view orientation plus visible degrees divided by 2, modulo 360. Finally, in block 1218, theta2 is placed in theta1 for the next loop. Then, in block 1220, the subroutine is called to redraw the perspective. Control continues to block 1214, where it is again determined if the user has stopped dragging the mouse. If so, the system returns in block 1222. The function GetTheta, as depicted in FIG. 12B, returns an angle value for an input x and y coordinate, with respect to the origin of the coordinates and an input aspect ratio. Block 1250 shows the start of the function and the input values delta x, delta y, and aspect ratio. In block 1252, the absolute value of delta x is stored in delta x absolute, and the absolute value of delta y is multiplied by the aspect ratio is stored in delta y absolute. Then, a decision is made in block 1254 as to whether the delta coordinate belongs in an even or odd quadrant, by comparing the result of a function Quad call with delta x and delta y as input, modulo 2, is 1. If the result of the function call to Quad shows an odd quadrant, theta is calculated in block 1256 as the arc tangent of delta y absolute divided by delta x absolute, that added to 90 degrees times the quadrant of delta x and delta y. If the function call in block 1254 shows an even quadrant, then theta is set in block 1258 equal to the arc tangent of delta x absolute divided by delta y absolute, with 90 degrees times the quadrant number of delta x and delta y. Finally, the value theta is returned in block 1260.

Figure 13:
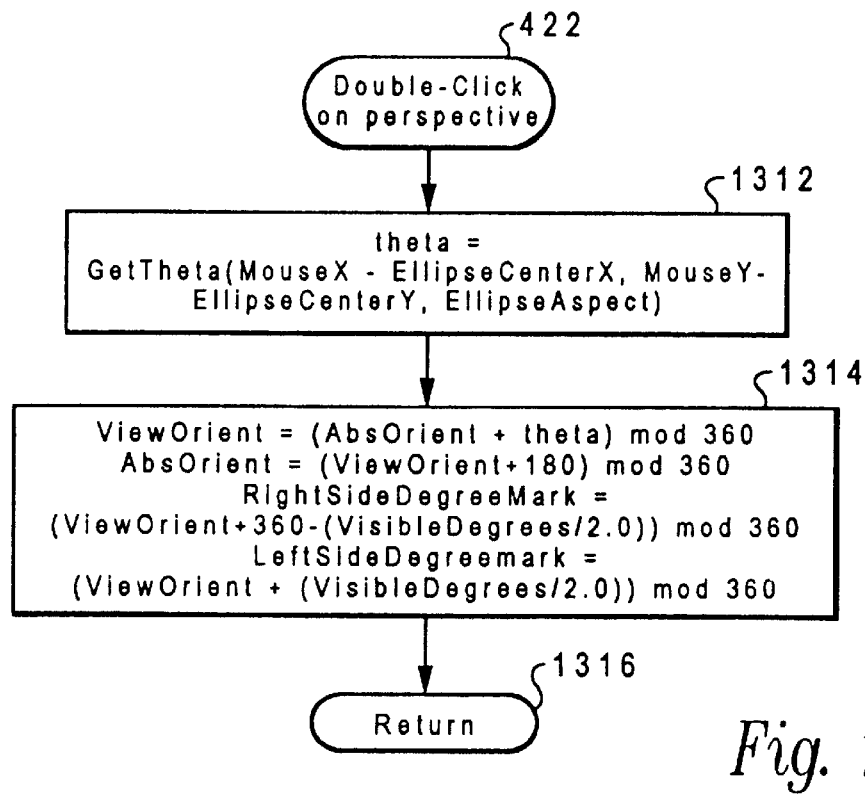
FIG. 13 depicts a block diagram of the double-click on perspective subroutine as depicted in FIG. 4.

When the system detects the double-click on perspective operation, the double-click on perspective subroutine block 422 is invoked, which is depicted by the flowchart in FIG. 13. In block 1312, the system determines the angle of the double-click relative to the center of the ellipse, by calling function GetTheta with the values mouse x coordinate minus ellipse center x coordinate, mouse y coordinate minus ellipse center y coordinate, and ellipse aspect ratio. Continuing in block 1314, the view orientation is updated with the quantity absolute orientation plus theta modulo 360. Then, in block 1314, the absolute orientation is set equal to the view orientation plus 180 degrees, the quantity modulo 360. Next, in block 1314, the right side degree mark is updated with the value of the view orientation plus 360 degrees minus visible degrees divided by 2, the entire quantity modulo 360. Lastly, in block 1314, the left side degree mark is set equal to the quantity of view orientation plus visible degrees divided by 2, modulo 360. The system then returns in block 1316.

Figure 14:
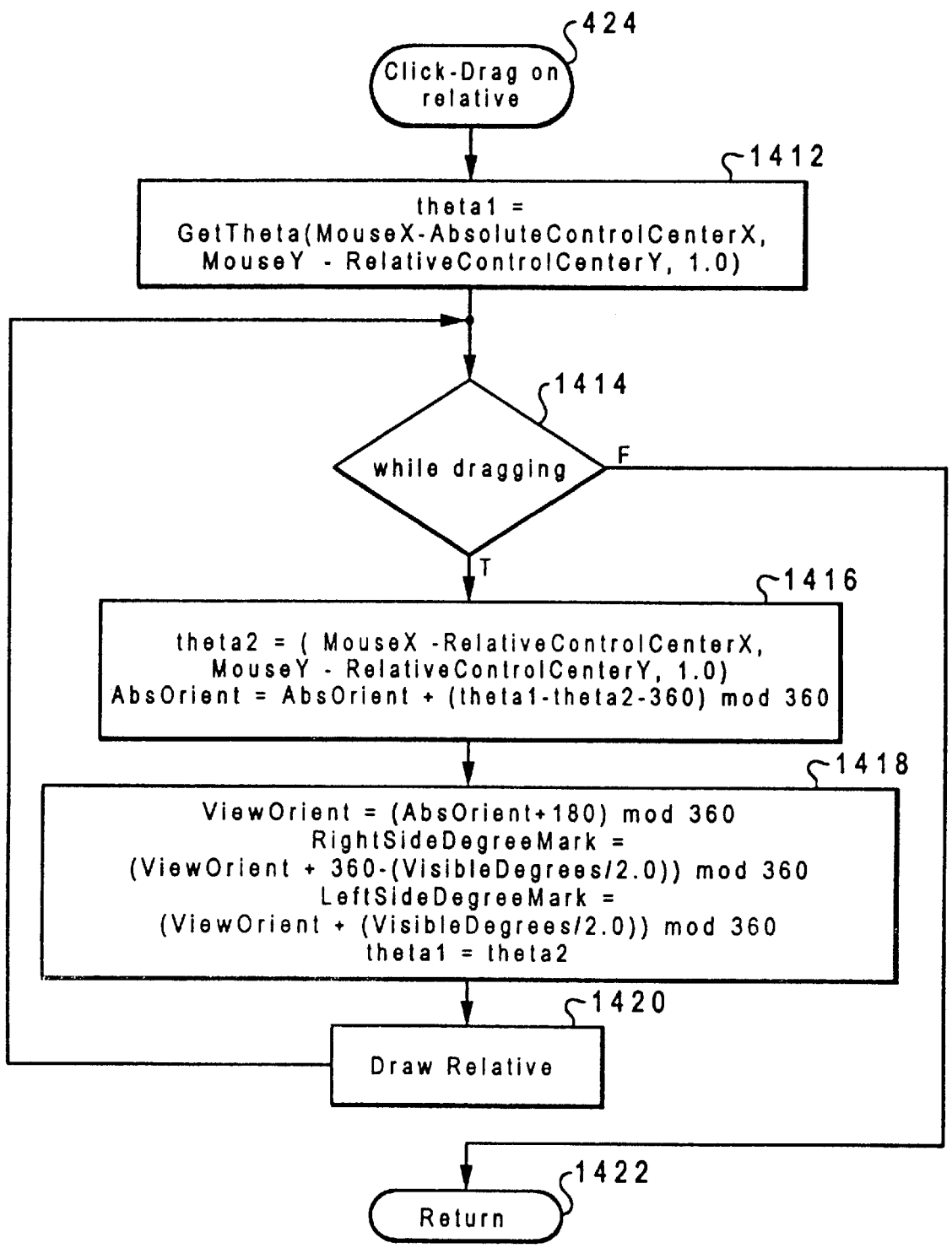
FIG. 14 is a block diagram of a flowchart depicting the click drag on relative subroutine described in FIG. 4.
Figure 16:
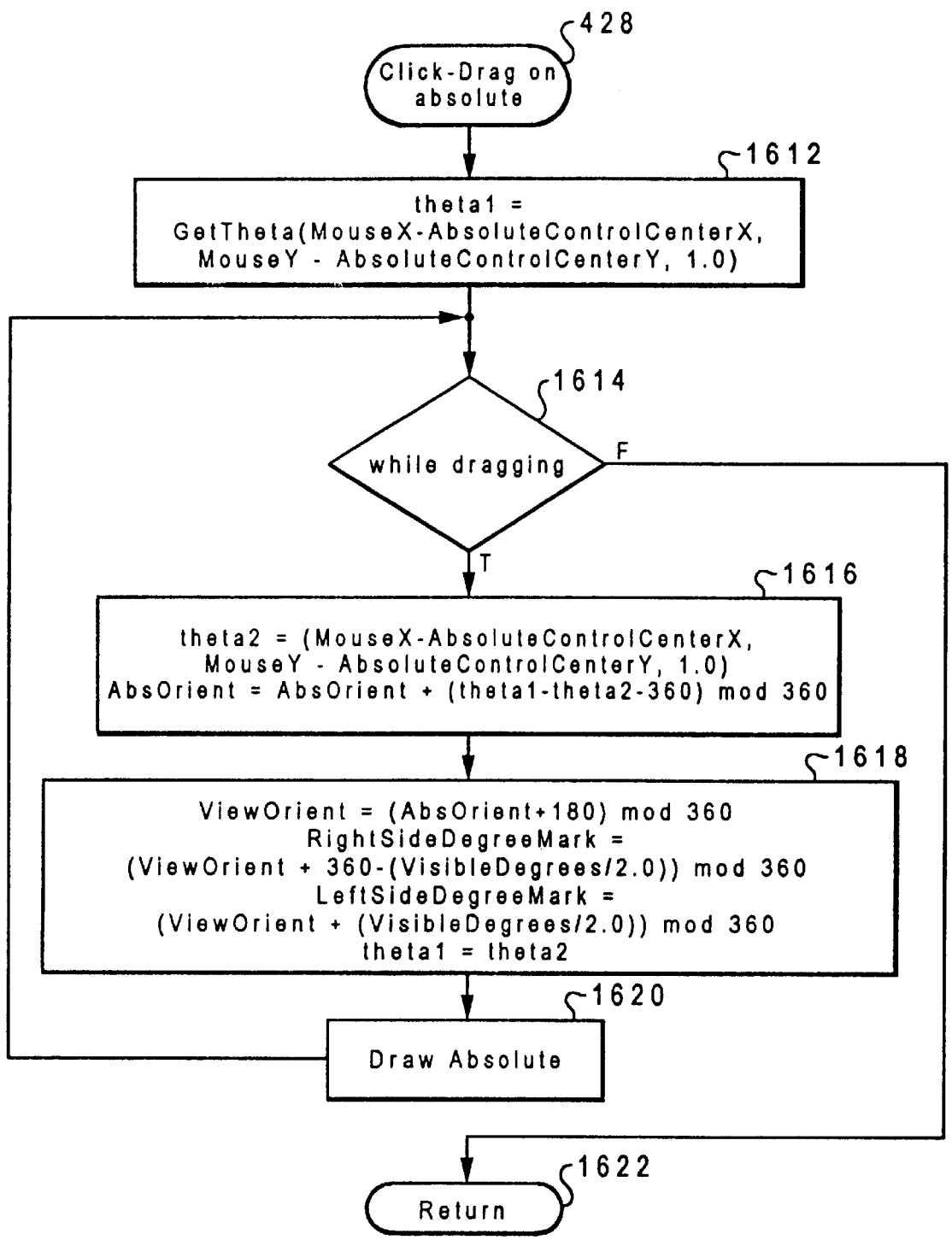
FIG. 16 is a flowchart of the click drag on absolute subroutine as depicted in FIG. 4.

If the system detects the click and drag on the relative control, the system invokes the subroutine block 424 depicted in the flowchart of FIG. 14. In block 1412, the system determines the angle theta1 of the first click in relation to the center of the relative control, by calling function GetTheta with the values mouse x coordinate minus relative control center x coordinate, mouse y coordinate minus relative control center y coordinate, and a ratio value of 1. While the user continues to drag the mouse and press the button in block 1414, the system, in block 1416, calculates the new angle of the mouse with respect to the relative control center, by calling GetTheta as before with the new mouse x and y coordinates, and keeping this value as theta2. Continuing in block 1416, the absolute orientation is set to the old value of absolute orientation plus the quantity theta1 minus theta2 plus 360 quantity modulo 360. Then, in block 1418, the view orientation is set equal to the absolute orientation plus 180 degrees, the quantity modulo 360 . Next, in block 1418, the right side degree mark and the left side degree mark are updated as before with the equations shown. Finally in block 1418, theta1 is set to theta2 for the next loop. In block 1420, the relative control dial is redrawn.

Control continues to block 1414, where, if the user has let up on the click button and stopped dragging the mouse, the system returns in block 1422.

Figure 15:
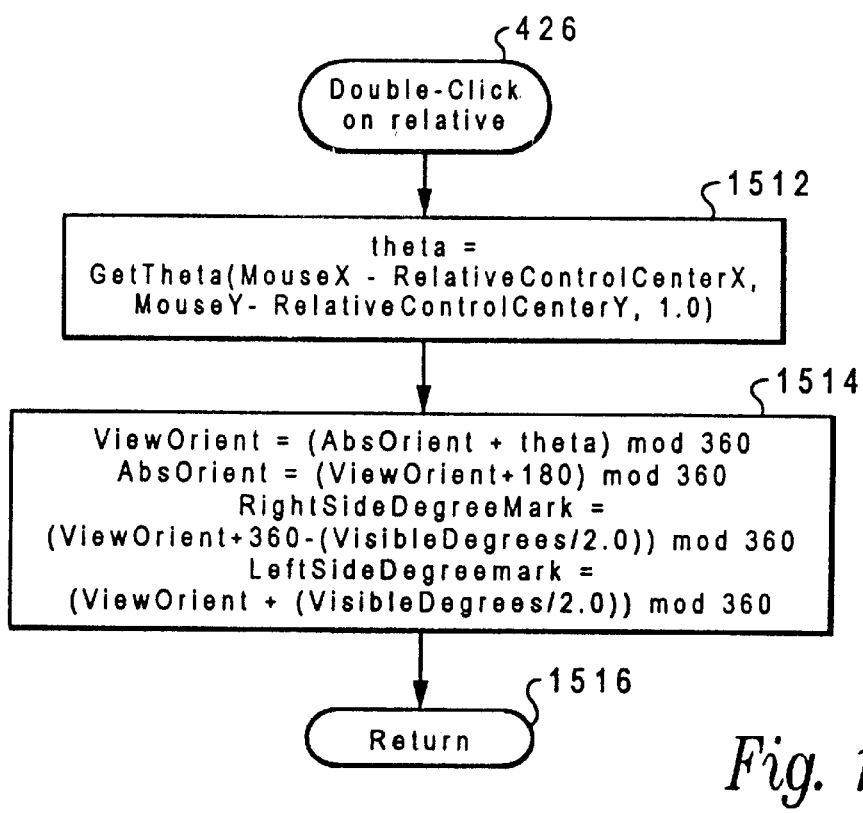
FIG. 15 depicts a flowchart of the double-click on relative subroutine as depicted in FIG. 4.

If the system detects a double click on the relative control, the system invokes the subroutine block 426 depicted in the flowchart of FIG. 15. In block 1512, the system determines the angle of the double-click in relation to the center of the relative control dial, by calling function GetTheta with the values mouse x coordinate minus relative control center x coordinate, mouse y coordinate minus relative control center y coordinate, and a ratio of 1. Then, the system, in block 1514, calculates the view orientation, absolute orientation, right side degree mark, and left side degree mark. Upon completion, the system returns in block 1516, If the system detects that the user action is the click drag activity on the absolute control, the system invokes the subroutine block 428 depicted in the flowchart of FIG. 16. First, the system, in block 1612, calls function GetTheta with the values mouse x coordinate minus relative control center x coordinate, mouse y coordinate minus relative control center y coordinate, and a ratio value of 1, in order to determine the angle of the first click, and puts this value in theta1. While the user continues to drag the mouse in block 1614, the system, in block 1616, calculates the new angle of the mouse with respect to the relative control center, by calling GetTheta again and keeping this value as theta2. Then in block 1616, the absolute orientation is set by the equation shown. In block 1618, the view orientation, the right side degree mark and left side degree mark are updated as before with the equations shown. Finally in block 1618, theta1 is set to theta2 for the next loop. In block 1620, the absolute control dial is redrawn. Control continues to block 1614, where, if the user has stopped dragging the mouse, the system returns in block 1622.

Figure 17:
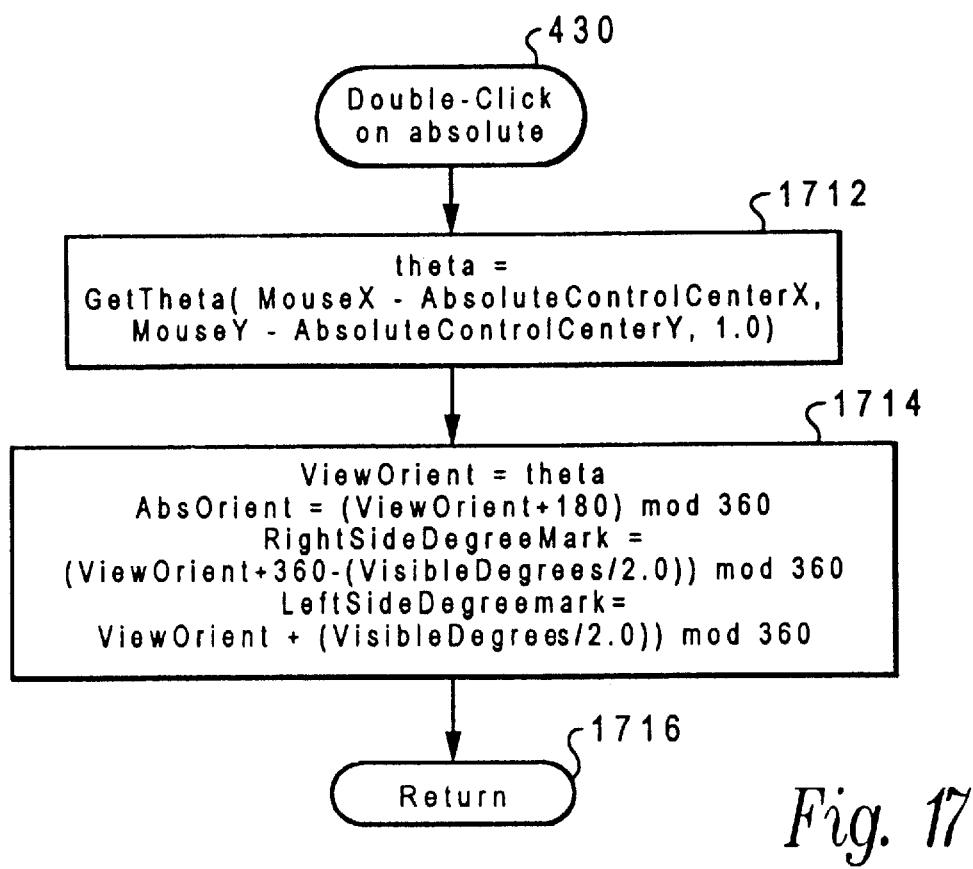
FIG. 17 is a flowchart of the double-click on absolute subroutine as depicted in FIG. 4.

If the system determines that the user action is the double click on the absolute control 322, the system invokes the subroutine block 430 depicted in the flowchart of FIG. 17. In block 1712, the system determines the angle theta of the double-click in relation to the center of the absolute control dial, by calling function GetTheta with the values mouse x coordinate minus absolute control center x coordinate, mouse y coordinate minus absolute control center y coordinate, and an aspect ratio of 1. Then, the system, in block 1714, sets the view orientation to theta, calculates the absolute orientation by taking the quantity view orientation plus 180 modulo 360, and determines the right side degree mark, and left side degree mark by the equations shown. Upon completion, the system returns in block 1716.

Figure 18:
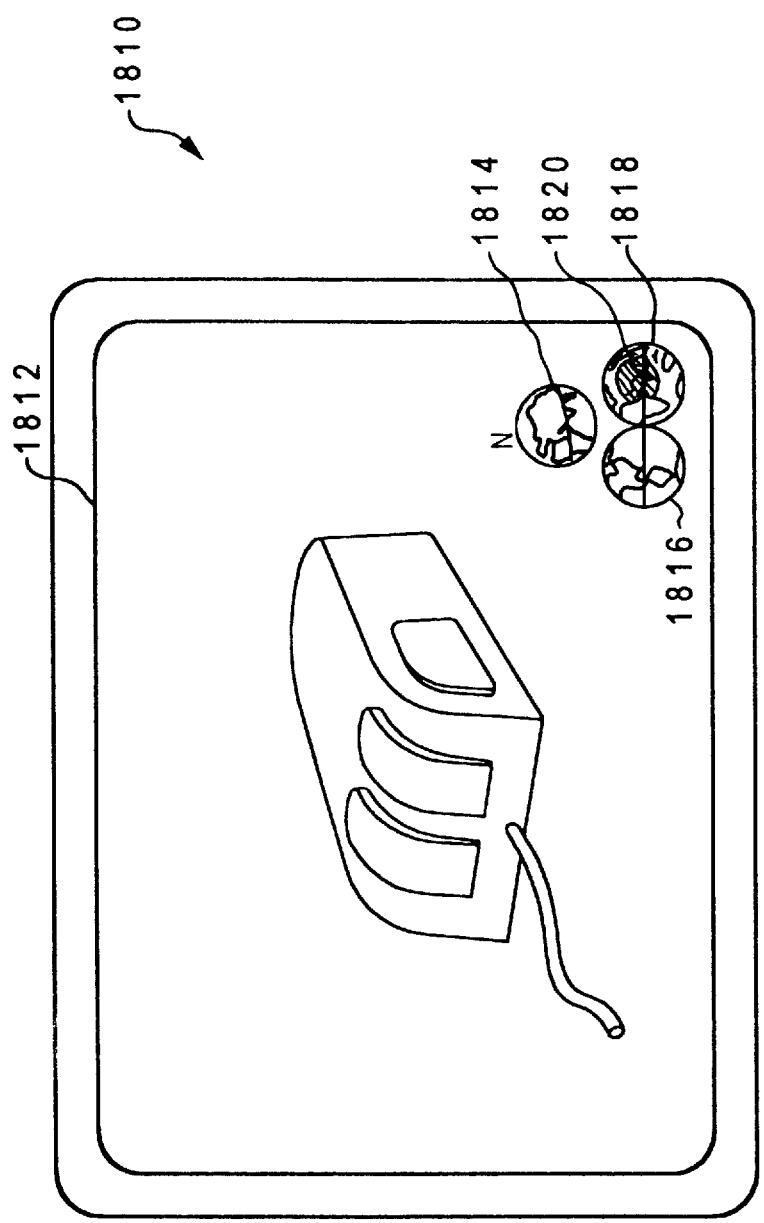
FIG. 18 is an illustration of a display screen using global mapping according to the present invention.

The mapping notation is not limited only to the cylindrical approach embodied in FIG. 3; but rather, the mapping annotation is applicable to other three-dimensional mapping arrangements, such as, for example, a spherical globe mapping arrangement or a toroidal mapping arrangement. One embodiment of the alternative mapping is depicted in FIG. 18. FIG. 18 illustrates a display screen 1810 having viewing field 1812 and three reference globes.

The first reference globe is relative globe 1814. The two remaining globes are absolute globes 1816 and 1818. Each absolute globe is representative of one-half of the sphere used for mapping. A shaded portion, or view identifier 1820, which is shaded over absolute globe 1818, for indicating the proximity of the view screen with respect to its location on the globe.

In mapping, the "up" on the globe is aligned with the "up" for z axis, of the space orientation, and a fixed point on the surface is aligned with the other axes, the x and y axes. Thus, as the space orientation, a view of the globe is shown that matches the particular orientation. Any view of the globe selected for its orientation has a corresponding space orientation for the object. A notation is displayed on screen 1810, and shows both the current view of the object, the corresponding view of the globe in that orientation, and the mapping of the view to a right side of the globe for absolute reference. On the control panel, a mouse or other pointing device, can grab part of the rotating globe and pull it around to a different orientation. Alternatively, a point on the fixed map can be selected and the globe will orient to that location automatically. Since the globe is a sphere, a track ball device would be a likely input device. In this case, the track ball can be considered the globe itself and the globe can be turned "directly" by turning the track ball. As the track ball spins in a certain direction, the screen is rotated in a corresponding change in globe orientation. This provides for an exceptionally intuitive interface with improved coordination and ease of use for multi-axial rotations.

Figure 19:
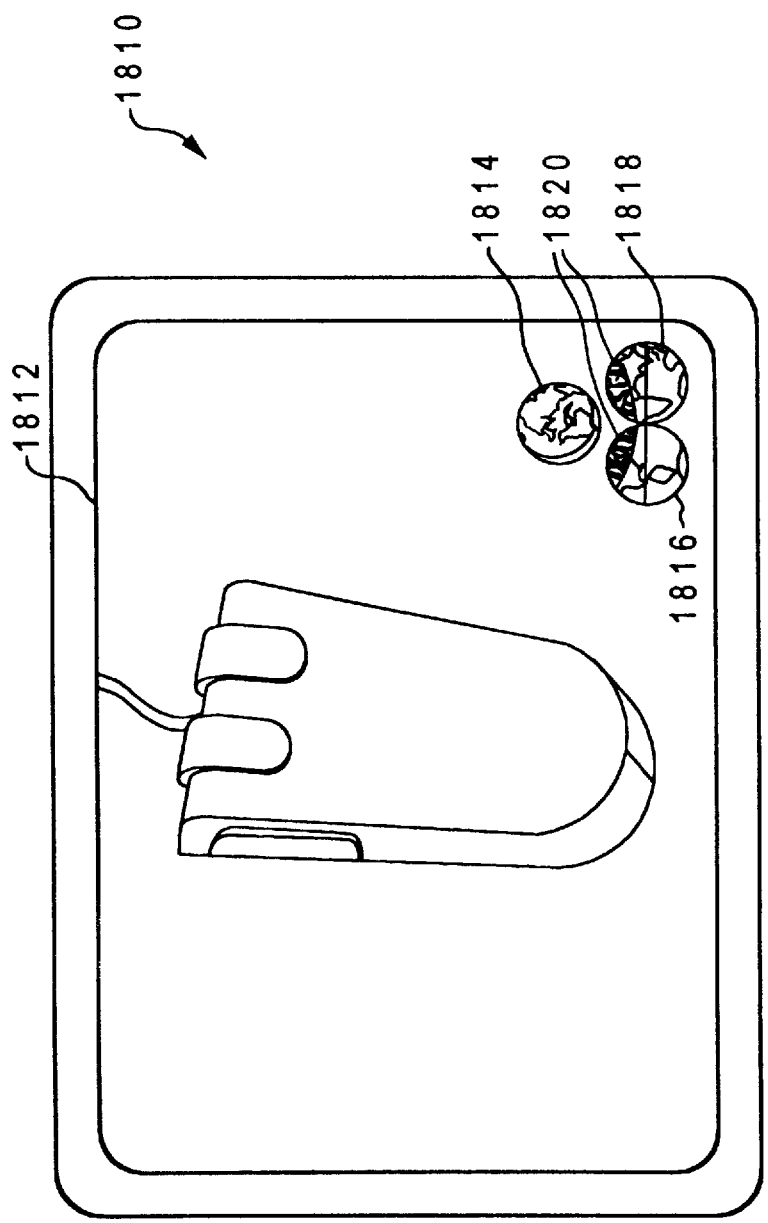
FIG. 19 is an illustration of FIG. 18 having a different orientation of the figure displayed.

FIG. 19 is the same figure as FIG. 18, but with the view of the object changed, which is reflected in the global mapping on the three orientation globes.

Figure 20:
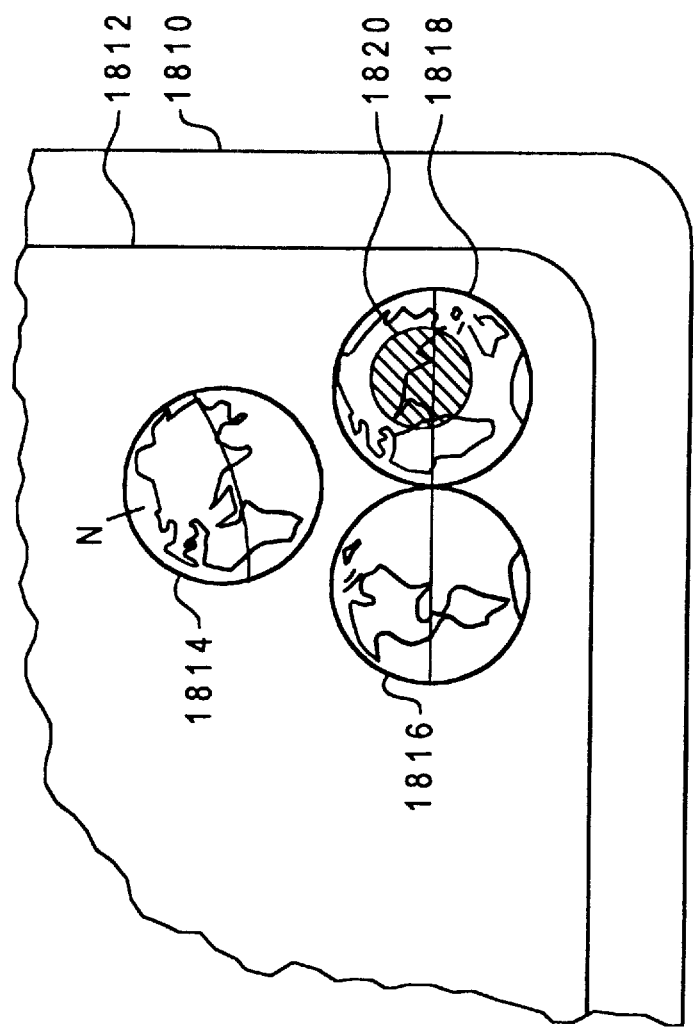
FIG. 20 is an enlarged view of the global orientation of that depicted in FIG. 18.
Figure 21:
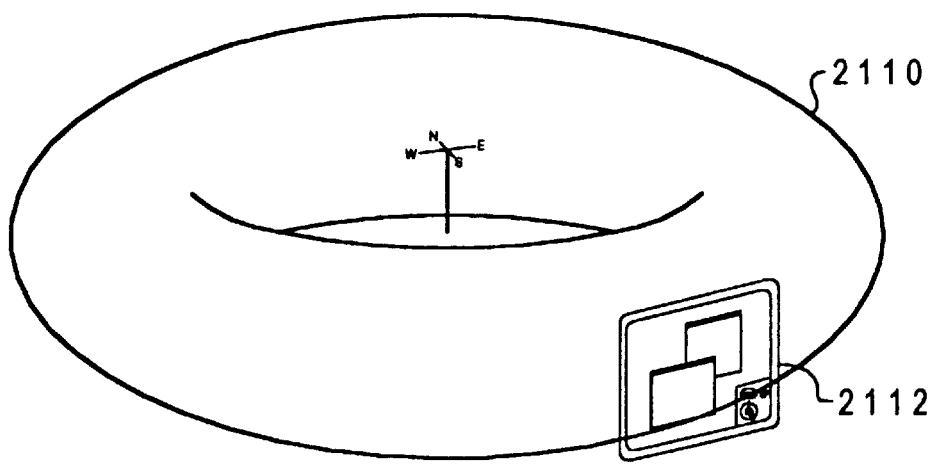
FIG. 21 depicts a virtual toroid, which serves as the basis for a mapping notation.

FIG. 20 is merely an enlarged view of the global orientation shown in FIG. 18. In FIG. 20, the control panel display has the orientation of the globe as the top globe reference. A standard and fixed position globe is shown as the lower two circles. The darkened area shows the part of the globe that is being viewed and therefore the angle of the view. For illustrative purposes, the view is darkened, while in application, this area would be highlighted on the video monitor. The globe mapping is especially useful in displaying three-dimensional objects on the monitor. This is evident in that as the globe is rotated about the multi axes available, so too is the displayed object rotated about the same axes to provide any of a myriad of views possible for the user. A second embodiment is illustrated in FIG. 21, which represents the virtual space as mapped onto a virtual toroid. Any spot on toroid 2110 has circularity or wrapping in both the right and left directions and both the up and down directions. Although this is true for a sphere as well, as the sphere is rotated forward from the viewing point, right side up objects on the back side of the sphere become upside down as they are brought to the front. Toroids, on the other hand, do not have this problem. From a single point of view, the objects on a toroid are always right side up as the toroid is rotated about a primary axis or secondary axis (the hole and the tube, respectively). This dual rotation matches the viewer's orientation of right and left and up and down, respectively. A display 2112 illustrates two windows on the surface of virtual toroid 2110.

Figure 22:
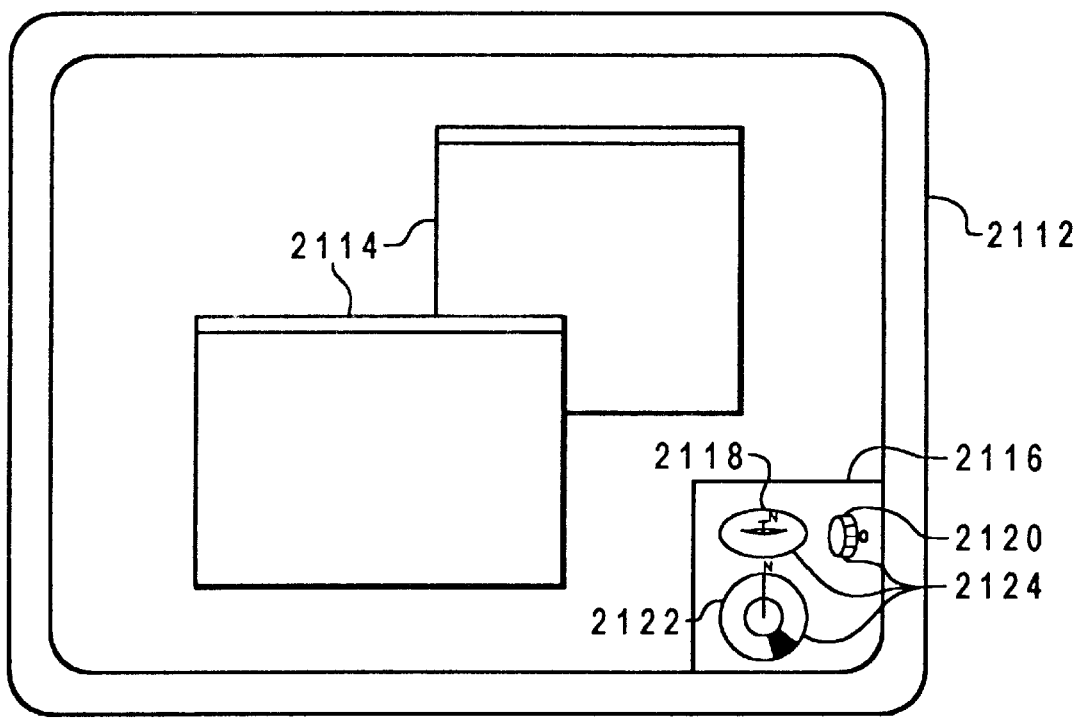
FIG. 22 illustrates a screen display of the virtual space of the toroid illustrated in FIG. 21.

FIG. 22 illustrates the same two windows 2114 as they are projected from the virtual space to the display space the user sees. In this example, the compass notation 2116 is attached to the major axis. In FIG. 22, three small views of the torus space is shown. The upper left shows the torus 2118 in the isometric view for general orientation and absolute positioning. The upper right shows a view of the cross section of tube 2120 with the lower torus 2122 view showing a straight-down view. On the two left views, the n is added to show the north compass direction. On the right view, a zero is added to signify zero degrees about the minor axis. On each view, the projection of the user's view space 2124 is highlighted. If the absolute position of the view goes to a hidden area of the small display torus, The highlighted area will be shown in a different color or with slashed lines.

Using the display controls, the user can get to any display space on the torus quickly by clicking on the area to be seen, or by selecting the view area and dragging it over the area to be seen.

While the invention has been particularly shown and described with reference to a preferred embodiment, it will be understood by those skilled in the art that various changes in form and detail may be made therein without departing from the spirit and scope of the invention.

We claim:

1. A display system comprising:

a display device;

means for generating an image in said display device;

means for mapping data corresponding to said image onto two three-dimensional control objects, a first three-dimensional control object representing a fixed view of said image and a second three-dimensional control object representing a relative view of said image; and means for controlling an orientation of said second three-dimensional control object such that a selected portion of said image is displayed by selecting a portion of said second three-dimensional object to be displayed by a pointing device, wherein said image on said selected portion of said relative three-dimensional control object is then displayed in said display device.

2. The display system according to claim 1 wherein said virtual three-dimensional object comprises a desktop.

3. The display system according to claim 1 wherein said virtual three-dimensional object displays said image data which comprises two-dimensional images.

4. The display system according to claim 1 wherein said means for controlling said virtual three-dimensional object such that a selected portion of said image data is displayed includes a relative position controller.

5. The display system according to claim 1 wherein said means for controlling said virtual three-dimensional object such that a selected portion of said image data is displayed includes an absolute position controller.

6. The display system according to claim 1 wherein said virtual three-dimensional object is cylindrical in structure.

7. The display system according to claim 1 wherein said virtual three-dimensional object is spherical in structure.

8. The display system according to claim 1 wherein said virtual three-dimensional object is toroidal in structure.

9. In a video imaging system that allows a user to manipulate an image displayed on a video display, said image being a partial image of a virtual image, a method of providing a three-dimensional mapping notation comprising the following steps:

establishing two three-dimensional control objects upon which said image will be mapped and then displayed, a first three-dimensional control object representing a fixed view of said image and a second three-dimensional control object representing a relative view of said image; and controlling the orientation of said relative three-dimensional control object such that a selected portion of said image is displayed by selecting a portion of said relative three-dimensional control object to be displayed by a pointing device, wherein said image on said selected portion of said relative three-dimensional control object is then displayed within said video display.

10. The method according to claim 9 wherein said controlling said orientation of said virtual three-dimensional object such that a selected portion of said image data is displayed includes a relative position controller.

11. The method according to claim 9 wherein said controlling said orientation of said virtual three-dimensional object such that a selected portion of said image data is displayed includes an absolute position controller.

12. A computer program product stored on a computer readable medium, comprising:

a video imaging system for displaying a selected portion of image data, wherein said video imaging system includes:

instruction means for generating an image in a display device;

instruction means for mapping data corresponding to said image onto two three-dimensional control objects, a first three-dimensional control object representing a fixed view of said image and a second three-dimensional control object representing a relative view of said image; and instruction means for controlling an orientation of said relative three-dimensional control object such that a selected portion of said image is displayed by permitting a user to select a portion of said relative three-dimensional control object to be displayed utilizing a pointing device, wherein said image on said selected portion of said relative three-dimensional control object is then displayed in said display device; and a signal bearing media bearing said video imaging system and adapted to be utilized within a data processing system.

* * * * *